(12) United States Patent
Silverstein et al.

(10) Patent No.: US 11,122,398 B2
(45) Date of Patent: Sep. 14, 2021

(54) SYSTEMS, METHODS, AND DEVICES FOR UTILIZING RADAR-BASED TOUCH INTERFACES

(71) Applicant: GOOGLE LLC, Mountain View, CA (US)

(72) Inventors: Brian Silverstein, San Carlos, CA (US); Eden Sherry, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 16/897,095

(22) Filed: Jun. 9, 2020

(65) Prior Publication Data
US 2020/0304966 A1     Sep. 24, 2020

Related U.S. Application Data

(63) Continuation of application No. 15/481,289, filed on Apr. 6, 2017, now Pat. No. 10,687,184.
(Continued)

(51) Int. Cl.
*H04W 4/33* (2018.01)
*G01S 13/56* (2006.01)
(Continued)

(52) U.S. Cl.
CPC ............. *H04W 4/33* (2018.02); *G01S 7/006* (2013.01); *G01S 13/42* (2013.01); *G01S 13/56* (2013.01);
(Continued)

(58) Field of Classification Search
CPC ....... H04W 4/33; H04W 4/029; H04W 8/005; G01S 7/006; G01S 13/42; G01S 13/58;
(Continued)

(56) References Cited

U.S. PATENT DOCUMENTS 2,101,637 A    12/1937   Davis
3,681,603 A    8/1972   Scheidweiler et al.
(Continued)

FOREIGN PATENT DOCUMENTS

CN    101305248 A    11/2008
CN    101522447 A    9/2009
(Continued)

OTHER PUBLICATIONS

Detroitborg, Nest Learning Thermostat: Unboxing and Review, (online), retrieved from the Internet: URL: http://www.youtube.com/watch?v=KrgcOL4oLzc, retrieved on Aug. 22, 2013, Feb. 10, 2012, pgs.
(Continued)

*Primary Examiner* — Mark W Regn
(74) *Attorney, Agent, or Firm* — Marshall, Gerstein & Borun LLP

(57) ABSTRACT

An electronic device is located in a room. The device has a casing, a first processor coupled to a radar transceiver, a second processor coupled to a motion sensor, and memory. Using the second processor, the device determines using signals from the motion sensor whether an object is in proximity. In accordance with a determination that the object is in proximity, the device wakes up the first processor. Using the first processor, the device enables operation of the radar transceiver. It determines using signals from the radar transceiver whether the object is in contact with the casing. In accordance with a determination that the object is in contact with the casing, the device identifies an input command based on at least one of: a location of the object, and a movement of the object, and adjusts operation based on the input command.

16 Claims, 27 Drawing Sheets

Related U.S. Application Data

(60) Provisional application No. 62/336,515, filed on May 13, 2016, provisional application No. 62/442,343, filed on Jan. 4, 2017, provisional application No. 62/438,397, filed on Dec. 22, 2016, provisional application No. 62/455,449, filed on Feb. 6, 2017.

(51) Int. Cl.
   *G01S 13/88* (2006.01)
   *H04W 4/029* (2018.01)
   *G01S 7/00* (2006.01)
   *G01S 13/42* (2006.01)
   *G01S 13/58* (2006.01)
   *G01S 13/86* (2006.01)
   *G01S 13/87* (2006.01)
   *H04W 8/00* (2009.01)

(52) U.S. Cl.
   CPC .............. *G01S 13/58* (2013.01); *G01S 13/86* (2013.01); *G01S 13/878* (2013.01); *G01S 13/88* (2013.01); *H04W 4/029* (2018.02); *H04W 8/005* (2013.01)

(58) Field of Classification Search
   CPC ........ G01S 13/86; G01S 13/878; G01S 13/56; G01S 13/88
   See application file for complete search history.

(56) References Cited

U.S. PATENT DOCUMENTS

| | | |
|---|---|---|
| 3,948,441 A | 4/1976 | Perkins et al. |
| 3,991,357 A | 11/1976 | Kaminski |
| 4,121,110 A | 10/1978 | Solomon |
| 4,157,506 A | 6/1979 | Spencer |
| 4,177,923 A | 12/1979 | Krump |
| 4,225,860 A | 9/1980 | Conforti |
| 4,249,696 A | 2/1981 | Donnelly et al. |
| 4,308,991 A | 1/1982 | Peinetti et al. |
| 4,319,234 A | 3/1982 | Rice |
| 4,460,125 A | 7/1984 | Barker et al. |
| 4,528,459 A | 7/1985 | Wiegel |
| 4,684,949 A | 8/1987 | Kalafus |
| 4,695,246 A | 9/1987 | Beilfuss et al. |
| 4,842,510 A | 6/1989 | Grunden |
| 4,845,474 A | 7/1989 | Moore et al. |
| 4,872,828 A | 10/1989 | Mierzwinski et al. |
| 4,898,229 A | 2/1990 | Brown et al. |
| 4,948,044 A | 8/1990 | Cacciatore |
| 4,955,805 A | 9/1990 | Ishiguro et al. |
| 4,955,806 A | 9/1990 | Grunden et al. |
| 5,107,918 A | 4/1992 | McFarlane et al. |
| 5,127,464 A | 7/1992 | Butler |
| 5,158,477 A | 10/1992 | Testa |
| 5,175,439 A | 12/1992 | Haerer et al. |
| 5,251,813 A | 10/1993 | Kniepkamp |
| 5,255,179 A | 10/1993 | Zekan et al. |
| 5,260,669 A | 11/1993 | Higgins et al. |
| 5,277,363 A | 1/1994 | Hart |
| 5,347,982 A | 9/1994 | Binzer et al. |
| 5,352,930 A | 10/1994 | Ratz |
| 5,381,950 A | 1/1995 | Aldridge |
| 5,422,808 A | 6/1995 | Catanese, Jr. et al. |
| 5,452,762 A | 9/1995 | Zillner, Jr. |
| 5,456,407 A | 10/1995 | Stalsberg et al. |
| 5,460,327 A | 10/1995 | Hill et al. |
| 5,462,225 A | 10/1995 | Massara et al. |
| 5,467,921 A | 11/1995 | Shreeve et al. |
| 5,506,569 A | 4/1996 | Rowlette |
| 5,544,036 A | 8/1996 | Brown, Jr. et al. |
| 5,570,837 A | 11/1996 | Brown et al. |
| 5,589,824 A | 12/1996 | Lynch |
| 5,595,342 A | 1/1997 | McNair et al. |
| 5,611,484 A | 3/1997 | Uhrich |
| 5,635,896 A | 6/1997 | Tinsley et al. |
| 5,646,349 A | 7/1997 | Twigg et al. |
| 5,655,709 A | 8/1997 | Garnett et al. |
| 5,697,552 A | 12/1997 | McHugh et al. |
| 5,719,557 A | 2/1998 | Rattman et al. |
| 5,736,795 A | 4/1998 | Zuehlke |
| 5,808,294 A | 9/1998 | Neumann |
| 5,903,139 A | 5/1999 | Kompelien |
| 5,918,474 A | 7/1999 | Khanpara et al. |
| 5,966,077 A | 10/1999 | Wong |
| 6,008,750 A | 12/1999 | Cottle |
| 6,060,719 A | 5/2000 | DiTucci et al. |
| 6,072,784 A | 6/2000 | Agrawal et al. |
| 6,084,518 A | 7/2000 | Jamieson |
| 6,084,522 A | 7/2000 | Addy |
| 6,089,310 A | 7/2000 | Toth et al. |
| 6,114,967 A | 9/2000 | Yousif |
| 6,213,404 B1 | 4/2001 | Dushane et al. |
| 6,218,995 B1 | 4/2001 | Higgins et al. |
| 6,222,719 B1 | 4/2001 | Kadah |
| 6,275,160 B1 | 8/2001 | Ha |
| 6,315,211 B1 | 11/2001 | Sartain et al. |
| 6,336,593 B1 | 1/2002 | Bhatnagar |
| 6,356,038 B2 | 3/2002 | Bishel |
| 6,377,182 B1 | 4/2002 | Devine et al. |
| 6,509,838 B1 | 1/2003 | Payne et al. |
| 6,513,723 B1 | 2/2003 | Mueller et al. |
| 6,566,768 B2 | 5/2003 | Zimmerman et al. |
| 6,619,055 B1 | 9/2003 | Addy |
| 6,622,925 B2 | 9/2003 | Carner et al. |
| 6,657,418 B2 | 12/2003 | Atherton |
| 6,743,010 B2 | 6/2004 | Bridgeman et al. |
| 6,778,091 B2 | 8/2004 | Qualey, III et al. |
| 6,794,771 B2 | 9/2004 | Orloff |
| 6,798,341 B1 | 9/2004 | Eckel et al. |
| 6,886,754 B2 | 5/2005 | Smith et al. |
| 6,956,463 B2 | 10/2005 | Crenella et al. |
| 7,174,239 B2 | 2/2007 | Butler et al. |
| 7,200,467 B2 | 4/2007 | Schanin et al. |
| 7,476,988 B2 | 1/2009 | Mulhouse et al. |
| 7,486,955 B2 | 2/2009 | Fukushima |
| 7,510,126 B2 | 3/2009 | Rossi et al. |
| 7,537,171 B2 | 5/2009 | Mueller et al. |
| 7,571,865 B2 | 8/2009 | Nicodem et al. |
| 7,579,945 B1 | 8/2009 | Richter et al. |
| 7,592,923 B2 | 9/2009 | Lax |
| 7,648,077 B2 | 1/2010 | Rossi et al. |
| 7,673,809 B2 | 3/2010 | Juntunen |
| 7,748,640 B2 | 7/2010 | Roher et al. |
| 7,755,220 B2 | 7/2010 | Sorg et al. |
| 7,775,452 B2 | 8/2010 | Shah et al. |
| 7,841,542 B1 | 11/2010 | Rosen |
| 7,900,849 B2 | 3/2011 | Barton et al. |
| 7,982,602 B2 | 7/2011 | Kates |
| 7,994,928 B2 | 8/2011 | Richmond |
| 8,016,205 B2 | 9/2011 | Drew |
| 8,091,375 B2 | 1/2012 | Crawford |
| 8,098,166 B2 | 1/2012 | Lang |
| 8,232,884 B2 | 7/2012 | Pattok et al. |
| 8,255,090 B2 | 8/2012 | Frader-Thompson et al. |
| 8,265,798 B2 | 9/2012 | Imes |
| 8,415,829 B2 | 4/2013 | Di Cristofaro |
| 8,706,270 B2 | 4/2014 | Fadell et al. |
| 8,752,711 B2 | 6/2014 | Campbell et al. |
| 8,942,274 B2 | 1/2015 | Thoukydides |
| 9,591,658 B2 | 3/2017 | Thoukydides |
| 10,613,213 B2 | 4/2020 | Silverstein et al. |
| 10,687,184 B2 | 6/2020 | Silverstein et al. |
| 10,798,539 B2 | 10/2020 | Marschalkowski et al. |
| 2002/0044061 A1 | 4/2002 | Johnson et al. |
| 2002/0063472 A1 | 5/2002 | Irvin |
| 2002/0074865 A1 | 6/2002 | Zimmerman et al. |
| 2003/0037555 A1 | 2/2003 | Street et al. |
| 2003/0064335 A1 | 4/2003 | Canon |
| 2003/0090243 A1 | 5/2003 | Atherton |
| 2003/0231001 A1 | 12/2003 | Bruning |
| 2004/0120084 A1 | 6/2004 | Readio et al. |
| 2004/0169587 A1 | 9/2004 | Washington |
| 2004/0192219 A1 | 9/2004 | Malone et al. |

(56) References Cited

U.S. PATENT DOCUMENTS

| | | |
|---|---|---|
| 2004/0209209 A1 | 10/2004 | Chodacki et al. |
| 2004/0245349 A1 | 12/2004 | Smith |
| 2005/0043907 A1 | 2/2005 | Eckel et al. |
| 2005/0145705 A1 | 7/2005 | Shah et al. |
| 2005/0170862 A1 | 8/2005 | Fukushima |
| 2005/0195757 A1 | 9/2005 | Kidder et al. |
| 2005/0212708 A1 | 9/2005 | Fifield |
| 2005/0215284 A1 | 9/2005 | Su et al. |
| 2005/0270151 A1 | 12/2005 | Winick |
| 2006/0014528 A9 | 1/2006 | Hsu et al. |
| 2006/0035657 A1 | 2/2006 | Lim |
| 2006/0102731 A1 | 5/2006 | Mueller et al. |
| 2006/0124759 A1 | 6/2006 | Rossi et al. |
| 2006/0132301 A1 | 6/2006 | Stilp |
| 2006/0133334 A1 | 6/2006 | Ross |
| 2006/0186214 A1 | 8/2006 | Simon et al. |
| 2006/0291483 A1 | 12/2006 | Sela |
| 2007/0045432 A1 | 3/2007 | Juntunen |
| 2007/0070961 A1 | 3/2007 | Tao |
| 2007/0095082 A1 | 5/2007 | Garrett et al. |
| 2007/0114848 A1 | 5/2007 | Mulhouse et al. |
| 2007/0115951 A1 | 5/2007 | Karaoguz et al. |
| 2007/0131787 A1 | 6/2007 | Rossi et al. |
| 2007/0218845 A1 | 9/2007 | Efland et al. |
| 2007/0228183 A1 | 10/2007 | Kennedy et al. |
| 2007/0241203 A1 | 10/2007 | Wagner et al. |
| 2007/0296280 A1 | 12/2007 | Sorg |
| 2008/0001734 A1 | 1/2008 | Stilp et al. |
| 2008/0015742 A1 | 1/2008 | Kulyk et al. |
| 2008/0054082 A1 | 3/2008 | Evans et al. |
| 2008/0054084 A1 | 3/2008 | Olson |
| 2008/0094010 A1 | 4/2008 | Black |
| 2008/0133956 A1 | 6/2008 | Fadell |
| 2008/0147242 A1 | 6/2008 | Roher et al. |
| 2008/0211910 A1 | 9/2008 | Niem et al. |
| 2008/0219377 A1 | 9/2008 | Nisbet |
| 2009/0099697 A1 | 4/2009 | Li et al. |
| 2009/0140057 A1 | 6/2009 | Leen |
| 2009/0194601 A1 | 8/2009 | Flohr |
| 2009/0195349 A1 | 8/2009 | Frader-Thompson et al. |
| 2009/0236433 A1 | 9/2009 | Mueller et al. |
| 2009/0241697 A1 | 10/2009 | Kato et al. |
| 2009/0248929 A1 | 10/2009 | Rofougaran |
| 2009/0259713 A1 | 10/2009 | Blumrich et al. |
| 2009/0323569 A1 | 12/2009 | Wentink |
| 2010/0006660 A1 | 1/2010 | Leen et al. |
| 2010/0053456 A1 | 3/2010 | Rowell |
| 2010/0070099 A1 | 3/2010 | Watson et al. |
| 2010/0084482 A1 | 4/2010 | Kennedy et al. |
| 2010/0084918 A1 | 4/2010 | Fells et al. |
| 2010/0106305 A1 | 4/2010 | Pavlak et al. |
| 2010/0106322 A1 | 4/2010 | Grohman |
| 2010/0127881 A1 | 5/2010 | Schechter et al. |
| 2010/0182743 A1 | 7/2010 | Roher |
| 2010/0193592 A1 | 8/2010 | Simon et al. |
| 2010/0220022 A1 | 9/2010 | Yoon et al. |
| 2010/0238036 A1 | 9/2010 | Holcombe |
| 2010/0304770 A1 | 12/2010 | Wietfeldt et al. |
| 2011/0012998 A1 | 1/2011 | Pan |
| 2011/0025257 A1 | 2/2011 | Weng |
| 2011/0045867 A1 | 2/2011 | Jeung et al. |
| 2011/0152024 A1 | 6/2011 | Kuehl |
| 2011/0215971 A1 | 9/2011 | Rao |
| 2011/0241624 A1 | 10/2011 | Park et al. |
| 2011/0253796 A1 | 10/2011 | Posa et al. |
| 2012/0017611 A1 | 1/2012 | Coffel et al. |
| 2012/0126019 A1 | 5/2012 | Warren et al. |
| 2012/0146796 A1 | 6/2012 | Margon et al. |
| 2012/0159023 A1 | 6/2012 | Rofougaran |
| 2012/0248211 A1 | 10/2012 | Warren et al. |
| 2012/0326912 A1 | 12/2012 | Aoyagi |
| 2013/0013975 A1 | 1/2013 | Yasufuku |
| 2013/0093594 A1 | 4/2013 | Brigham et al. |
| 2013/0176401 A1 | 7/2013 | Monari et al. |
| 2013/0263034 A1 | 10/2013 | Bruck |
| 2013/0265470 A1 | 10/2013 | Liu et al. |
| 2014/0006586 A1 | 1/2014 | Hong et al. |
| 2014/0013361 A1 | 1/2014 | Monari et al. |
| 2014/0028510 A1 | 1/2014 | Yoon et al. |
| 2014/0043496 A1 | 2/2014 | Azuma |
| 2014/0049480 A1* | 2/2014 | Rabii ............... G06F 3/041 345/173 |
| 2014/0118257 A1* | 5/2014 | Baldwin ............ G06F 3/017 345/158 |
| 2014/0184890 A1 | 7/2014 | McKinley |
| 2014/0279122 A1 | 9/2014 | Luna |
| 2014/0324410 A1 | 10/2014 | Mathews et al. |
| 2014/0347478 A1 | 11/2014 | Cho et al. |
| 2014/0365304 A1* | 12/2014 | Showers ........... G01S 5/0252 705/14.55 |
| 2015/0015713 A1 | 1/2015 | Wang et al. |
| 2015/0096876 A1 | 4/2015 | Mittleman et al. |
| 2015/0120000 A1 | 4/2015 | Coffey |
| 2015/0237424 A1 | 8/2015 | Wilker et al. |
| 2015/0301031 A1 | 10/2015 | Zin et al. |
| 2015/0309602 A1* | 10/2015 | Katayama ......... G06F 3/041 345/174 |
| 2016/0041618 A1 | 2/2016 | Poupyrev |
| 2016/0098089 A1 | 4/2016 | Poupyrev |
| 2016/0189380 A1 | 6/2016 | Li et al. |
| 2016/0261793 A1 | 9/2016 | Sivan |
| 2016/0286169 A1 | 9/2016 | Sannala |
| 2016/0286607 A1 | 9/2016 | Mishra et al. |
| 2016/0337453 A1 | 11/2016 | Lee |
| 2017/0052618 A1* | 2/2017 | Lee ................... G09G 5/006 |
| 2017/0285860 A1* | 10/2017 | Siddiq ............. G06F 3/04883 |
| 2017/0285861 A1 | 10/2017 | Siddiq |
| 2017/0290011 A1* | 10/2017 | Kushnir ............ H01Q 3/36 |
| 2019/0154843 A1 | 5/2019 | Kim |

FOREIGN PATENT DOCUMENTS

| | | |
|---|---|---|
| CN | 101849311 A | 9/2010 |
| EP | 0207295 A1 | 1/1987 |
| EP | 510807 A2 | 10/1992 |
| EP | 660287 A1 | 6/1995 |
| EP | 690363 A2 | 1/1996 |
| EP | 1 154 285 A2 | 11/2001 |
| EP | 1184804 A2 | 3/2002 |
| EP | 2302326 A1 | 3/2011 |
| EP | 2769275 A1 | 8/2014 |
| GB | 2294828 A | 5/1996 |
| JP | H9298780 A | 11/1997 |
| JP | 2005-17112 A | 1/2005 |
| JP | 2007-019575 A | 1/2007 |
| TW | 535320 B | 6/2003 |
| TW | 200709529 A | 3/2007 |
| TW | 201232994 A | 8/2012 |
| WO | WO-2008/054938 A2 | 5/2008 |
| WO | WO-2008/085200 A2 | 7/2008 |
| WO | WO-2011/131938 A1 | 10/2011 |
| WO | WO-2012/068437 A2 | 5/2012 |
| WO | WO-2013/058820 A1 | 4/2013 |
| WO | WO-2015/174879 A1 | 11/2015 |
| WO | WO-2016/053645 A1 | 4/2016 |

OTHER PUBLICATIONS

First Action Interview Office Action Summary dated May 29, 2015 for U.S. Appl. No. 14/463,550, filed Aug. 19, 2014, all pages.

First Examination Report for India Application No. 201847030068, dated Aug. 18, 2020.

Google Inc., International Search Report/Written Opinion, PCT/US2017/031977, dated Aug. 8, 2017, 10 pgs.

Google LLC, Communication 161(1) and 162 EPC 16742443.1, dated Jan. 23, 2018.

Google LLC, Communication EPC 16742443.1, dated Mar. 21, 2018, 1 pg.

International Preliminary Report on Patentability dated Apr. 22, 2014, for International Patent Application No. PCT/US2012/030084 filed Mar. 22, 2012, 5 pgs.

(56) References Cited

OTHER PUBLICATIONS

International Preliminary Report on Patentability dated Feb. 25, 2014 for International Patent Application No. PCT/US2011/061344 filed Nov. 18, 2011, all pages.
International Preliminary Report on Patentability, PCT/US2016/037401, dated Dec. 19, 2017, 8 pgs.
International Search Report and Written Opinion dated Feb. 20, 2014 for International Application No. PCT/US2013/061021, 18 pgs.
International Search Report and Written Opinion dated Jul. 14, 2014 for International Patent Application PCT/US14/22834 filed Mar. 10, 2014, all pages.
International Search Report and Written Opinion dated Jul. 6, 2012 for International Patent Application No. PCT/US2012/030084 filed Mar. 22, 2012, 6 pgs.
International Search Report and Written Opinion dated Jun. 7, 2012 for International Patent Application No. PCT/US2011/061344 filed Nov. 18, 2011, 9 pages.
Li Yiran et al. "Wireless Radar Devices for Smart Human-Computer Interaction", 2013 IEEE 56th International Midwest Symposium on Circuitsa and Systems,Aug. 3, 2014, 65-68 pgs.
Pre-Interview Communication dated Feb. 27, 2015 for U.S. Appl. No. 14/457,492, filed Aug. 12, 2014, all pages.
Rauchwarnmelder, Design (online), GIRA (retrieved on Mar. 7, 2013). (retrieved from the internet: <URL: http://gira.de/gebaeudetechnik/produkte/sicherheit/rauchwarnmelderdualvds-.html?vid=1145>; 2 pgs.
Rauchwarnmelder, Installation and User Manual (online). GIRA (retrieved on Mar. 8, 2013). Retrieved from the internet: <URL: http://download.gira.de/data2/23301210.pdf.
Rauchwarnmelder,Datasheet (online), GIRA (retrieved on Mar. 7, 2013). (retrieved from the internet: <URL: http://gira.de/gebaeudetechnik/produkte/sicherheit/rauchwarnmelderdualvds-.html>; 6 pgs.
SA720 Smoke Alarm User Manual, First Alert, Aug. 2007, 6 pgs., Feb. 26, 2021.
Shadrach, Energy Scavenging for Wireless Sensor Nodes with a Focus on Vibration to Electricity Conversion, Dissertation [online], retrieved from the Internet: <URL: http://users.cecs.anu.edu.au/--Shad.Roundy/paper/ShadThesis.pdf>, Jun. 2003,297 pages.
Smoke Alarm User Manual, Kidde, i9060, Dec. 1, 2009, 2 pgs.
U.S. Appl. No. 13/034,678, Non-Final Office Action dated Aug. 19, 2013, 9 pages.
U.S. Appl. No. 13/034,678, Notice of Allowance dated Feb. 4, 2014, 9 pages.
Wagner et al., On Optimal Tag Placement for Indoor Localization, Mar. 19-23, 2012, 9 pgs.
Weng et al., 400-MHz/2.4-GHz Combo WPAN Tranceiver IC for simulataneous Bual-Band communication with one single antena (year:2018), 13 pgs.
Wireless Radar Devices for Smart Human-Computer Interaction, Li et al, 2014, IEEE (Year: 2014).
Zhang et al., A Low Complexity Detector for Uplink Massive MIMO Systems Based on Gaussian Approximate Belief Propagation, 2015, 5 pgs.
Office Action for European Application No. 17725046.1, dated May 17, 2021.

* cited by examiner

SYSTEMS, METHODS, AND DEVICES FOR UTILIZING RADAR-BASED TOUCH INTERFACES

RELATED APPLICATIONS

This application is a continuation of U.S. patent application Ser. No. 15/481,289, filed Apr. 6, 2017, titled "Systems, Methods, and Devices for Utilizing Radar-Based Touch Interfaces," which claims the benefit of: (i) U.S. Provisional Application No. 62/336,515, filed May 13, 2016, titled "Systems, Methods, and Devices for Utilizing Radar with Smart Devices," (ii) U.S. Provisional Application No. 62/442,343, filed Jan. 4, 2017, titled "Systems, Methods, and Devices for Utilizing Radar with Smart Devices," (iii) U.S. Provisional Application No. 62/438,397, filed Dec. 22, 2016, titled "Systems, Methods, and Devices for Utilizing Radar-based Touch Interfaces," and (iv) U.S. Provisional Application No. 62/455,449, filed Feb. 6, 2017, titled "Systems, Methods, and Devices for Utilizing Radar with Smart Devices," each of which is hereby incorporated by reference in its entirety.

TECHNICAL FIELD

This relates generally to radar technology, including but not limited to methods and systems for utilizing radar-based touch interfaces.

BACKGROUND

Devices in a smart home environment include a host of circuit components and interfaces for enabling communications with other systems, devices, and/or servers. Some smart devices include multiple radios within a compact area for receiving and transmitting signals on various wavelengths to other devices and across networks. For example, some smart devices gather information and/or communicate via radar.

SUMMARY

Accordingly, there is a need for methods, apparatuses, and systems for managing radar usage and communications. Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to manage radar with smart devices.

Radar systems can detect the presence, location, direction, distance, and/or speed of objects. Radar sensors have several advantages over other detection systems, such as passive infrared motion sensors (PIR) and cameras. Radar systems detect a wide range of velocities and thus can differentiate between different objects in motion. As used herein, the term "object" includes non-living objects, such as cars, airplanes, ceiling fans, tables, etc., and living entities, such as people, animals, and plants. In addition, a radar system can detect whether an object is moving toward, or away, or tangential to the radar system. Radar systems are capable of detecting minute movements, such as finger gestures. Also, radar systems are largely unaffected by changes in light levels, temperature, and static energy.

In one aspect, a method for implementing a radar-based touch interface is performed at a computing device having a casing, a radar transceiver, one or more processors, and memory. The method includes: (1) detecting, via the radar transceiver, one or more signals indicating that an object is in proximity to the computing device; (2) determining whether the object is in contact with the casing based on the detected one or more signals; (3) in accordance with a determination that the object is in contact with the casing, identifying an input command based on at least one of: a location of the object, and a movement of the object; and (4) adjusting operation of the computing device based on the input command.

In another aspect, a computing device implementing a radar-based touch interface includes: (1) a casing; (2) a radar transceiver configured to detect one or more objects in the vicinity of the computing device; and (3) one or more controllers coupled to the radar transceiver, the one or more controllers configured to, for each detected object in the one or more detected objects: (a) determine whether the detected object is in contact with the casing based on data received from the radar transceiver; (b) in accordance with a determination that the detected object is in contact with the casing, identifying an input command based on at least one of: a location of the detected object, and a movement of the detected object; and (c) adjust operation of the computing device based on the input command.

In addition, radar systems can be configured to consume less power by adjusting a duty cycle and/or sending out brief pulses at set intervals. A radar system may be one-dimensional (1-D) or multi-dimensional. A one-dimensional radar consists of 1 transmitter and 1 receiver. A multi-dimensional radar includes a plurality of transmitters and/or a plurality of receivers (e.g., 3 transmitters and 4 receivers).

A radar system can be used for multiple purposes, including proximity detection, occupancy determinations, people counts, location determinations, single-person respiration monitoring, classification of motion events, multi-person respiration monitoring, single-person identification, and multi-person identification. For some purposes, such as proximity and/or single-person respiration monitoring, 1-D radar systems can be as effective (or nearly as effective) as multi-dimensional radar systems. For other purposes, such as location determinations and multi-person respiration monitoring, multi-dimensional radar systems provide significantly more precision and/or accuracy. In some implementations, a plurality of 1-D radar systems are networked together to provide precision and accuracy as good as, or better, than a single multi-dimensional radar system.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 1:
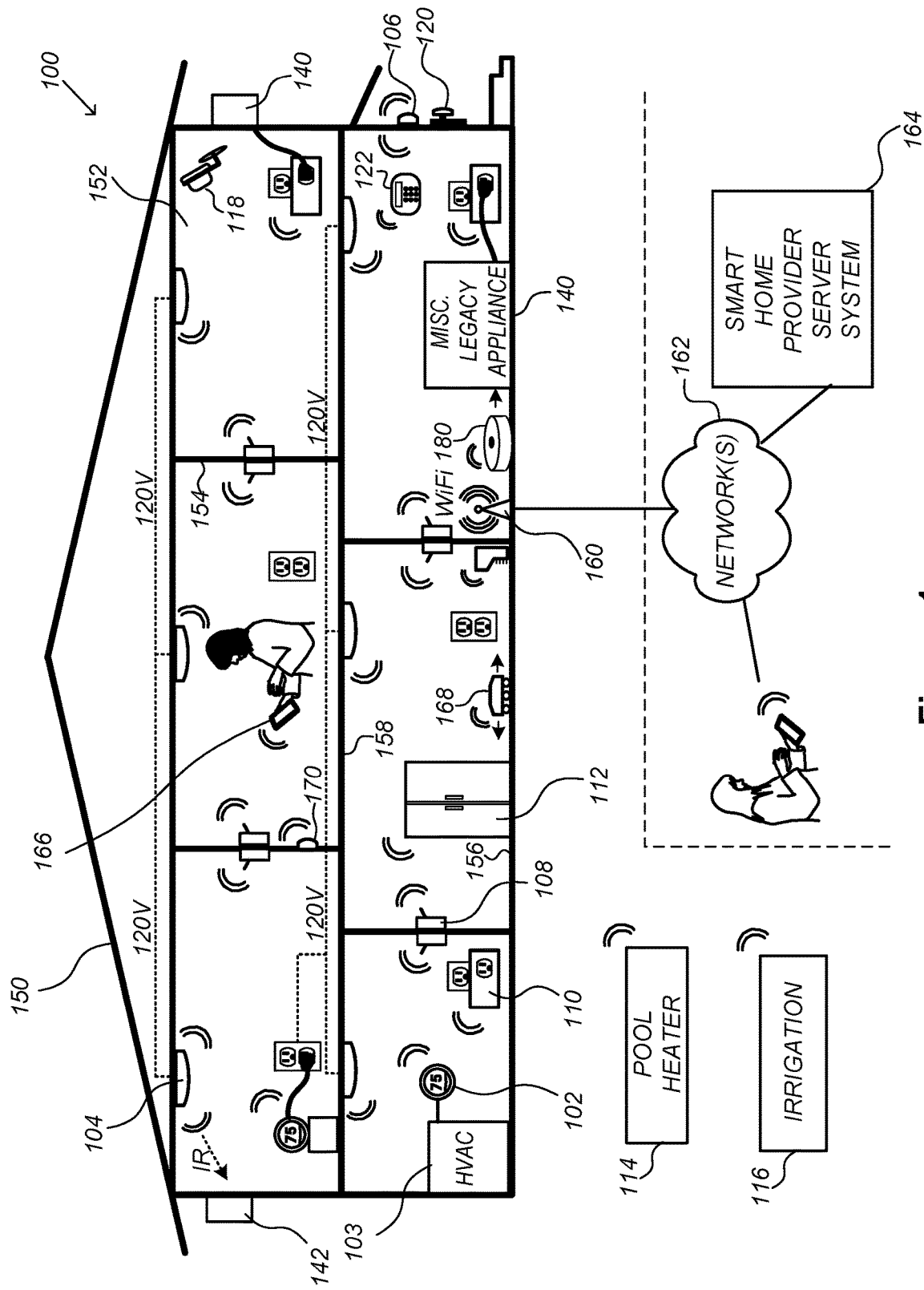
FIG. 1 is an example smart home environment, in accordance with some implementations.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, affixed to, integrated with and/or supported by a wall 154, floor 156 or ceiling 158. In some embodiments, electronic tags are affixed to a wall 154, floor 156, ceiling 158, window, or door.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (e.g., "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). The cameras 118 optionally include one or more sensors (e.g., IR sensors, radar systems, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

In some implementations, the smart home environment 100 includes one or more electronic tags that are configured to communicate with one or more smart devices via radar. In some implementations, the electronic tags are affixed to an object such as a window, door, or wall and are configured to impart a radar signature for the object. In some implementations, the electronic tags are affixed to an entity, such as a pet, and are configured to impart a radar signature for the entity. In some implementations, the electronic tags are configured to communicate via multiple wavelengths and/or protocols. For example a particular electronic tag is configured to communicate via RFID as well as via radar. In some implementations, a smart device, such as any of the smart devices discussed previously, includes a radar module for detecting the presence, direction, distance, and/or speed of objects, by sending out pulses of high-frequency electromagnetic waves that are reflected off the object back to the source. In some implementations, a smart device further includes a communications module, distinct from the radar module, for communicating with other smart devices and/or the electronic tags (e.g., via RFID, Wi-Fi, Bluetooth, and the like).

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices communicate via radar. In some implementations, the smart devices communicate with one or more electronic tags via radar. In some implementations, the smart devices communicate with one another and/or with electronic tags using a plurality of communication channels, such as RFID and radar. In some implementations, the smart devices communicate via one or more radio frequency bands, such as 3-10 GHz, 24-24.5 GHz, 57-64 GHz, and/or 77-81 GHz.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application (sometimes called a smart home application) running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device. In some implementations, hub device 180 further comprises a local storage device for storing data related to, or output by, smart devices of smart home environment 100. In some implementations, the data includes one or more of: video data output by a camera device, metadata output by a smart device, settings information for a smart device, usage logs for a smart device, and the like.

Figure 7A:
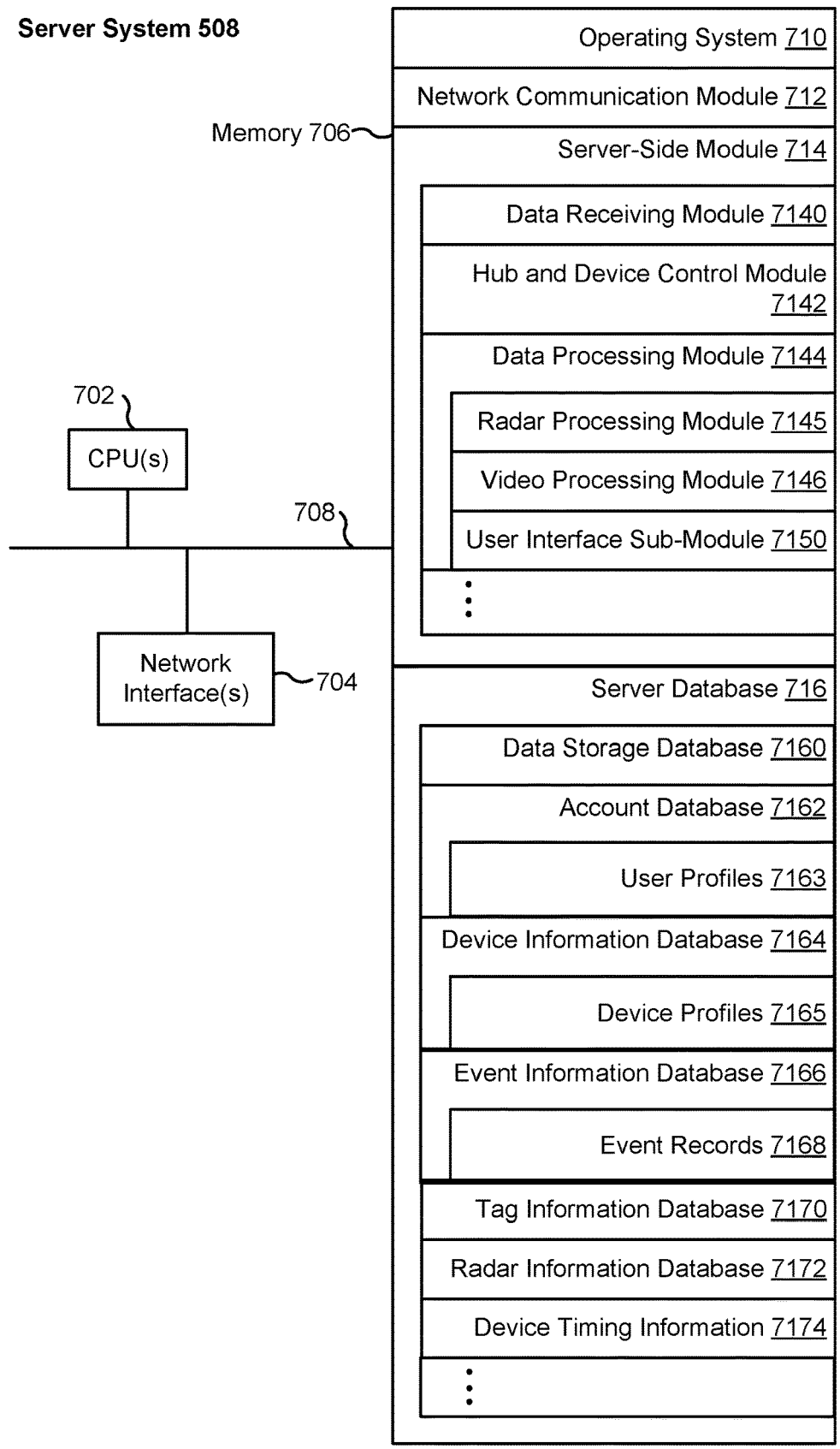
FIG. 7A is a block diagram illustrating a representative server system, in accordance with some implementations.

In some implementations, smart home environment 100 includes a local storage device for storing data related to, or output by, smart devices of smart home environment 100. In some implementations, the data includes one or more of: video data output by a camera device (e.g., camera 118), metadata output by a smart device, settings information for a smart device, usage logs for a smart device, and the like. In some implementations, the local storage device is communicatively coupled to one or more smart devices via a smart home network (e.g., smart home network 202, FIG. 2). In some implementations, the local storage device is selectively coupled to one or more smart devices via a wired and/or wireless communication network. In some implementations, the local storage device is used to store video data when external network conditions are poor. For example, the local storage device is used when an encoding bitrate of camera 118 exceeds the available bandwidth of the external network (e.g., network(s) 162). In some implementations, the local storage device temporarily stores video data from one or more cameras (e.g., camera 118) prior to transferring the video data to a server system (e.g., server system 508, FIG. 5). In some implementations, the local storage device is a component of a camera device. In some implementations, each camera device includes a local storage. In some implementations, the local storage device performs some or all of the data processing described below with respect to server system 508 (FIG. 7A). In some implementations, the local storage device stores some or all of the data described below with respect to server system 508, such as data storage database 7160, account database 7162, device information database 7164, and event information database 7166. In some implementations, the local storage device performs some or all of the operations described herein with respect to the server system 508.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings or other structures, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

Figure 2:
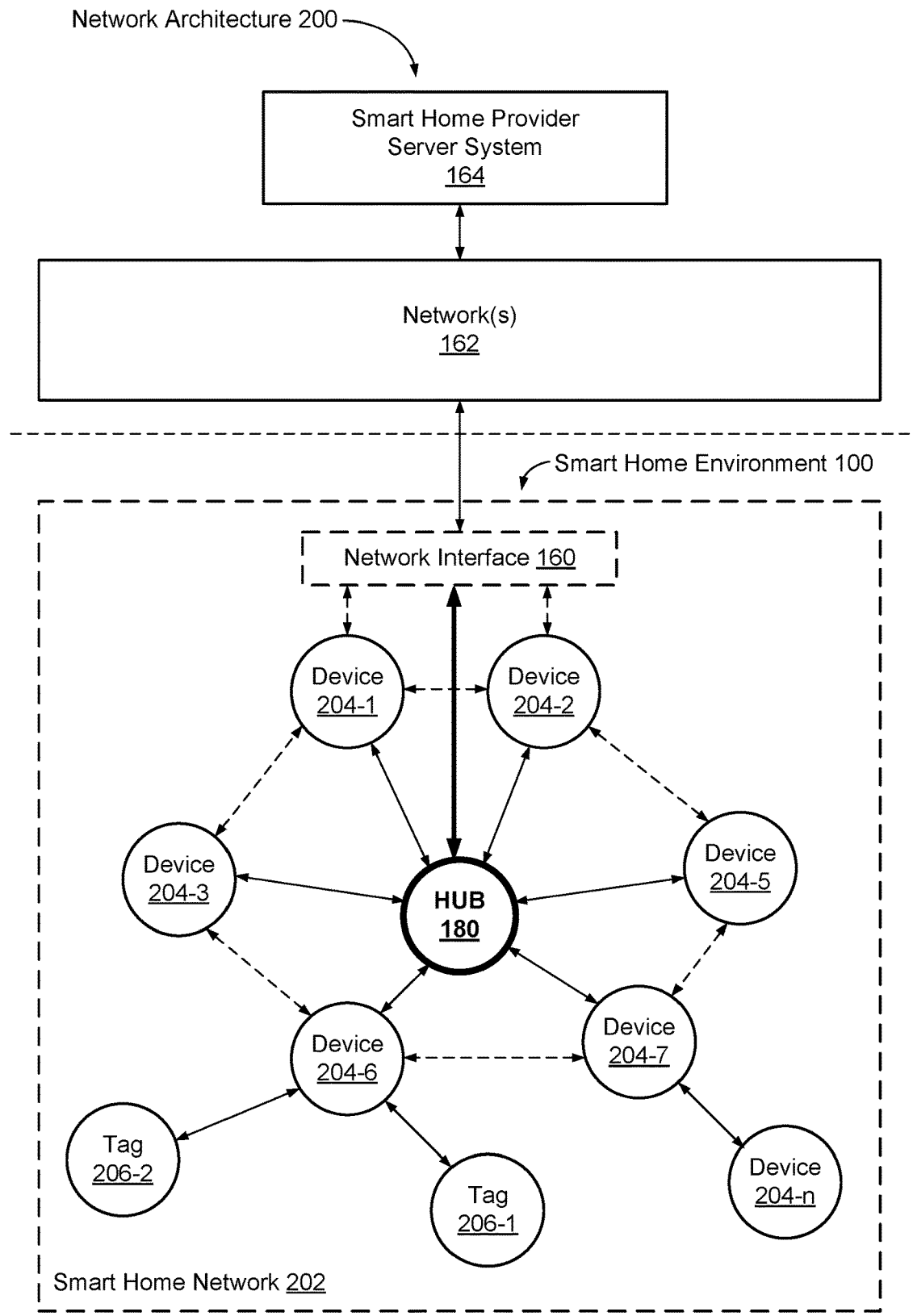
FIG. 2 is a block diagram illustrating an example network architecture that includes a smart home network, in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, radar, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes. In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 optionally send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment includes electronic tags 206, such as the electronic tag 206-1 and the electronic tag 206-2. In some implementations, the electronic tags 206 are low-power nodes in the smart home network 202. In some implementations, the electronic tags 206 are not connected to an external power source. In some implementations, the electronic tags 206 are battery-powered. In some implementations, an electronic tag (e.g., electronic tag 206-1) is capable of harvesting energy for use in operating the tag. For example, harvesting thermal, vibrational, electromagnetic, and/or solar energy received by the electronic tag.

In some implementations, electronic tags 206 are capable of "listening" on a first communication channel (e.g., an RFID channel), but not sending messages. In some implementations, electronic tags 206 are passive radar devices. Passive radar devices comprise radar devices that do not have a dedicated transmitter.

Passive radar devices include corner reflector devices and printed radar devices. Corner reflector devices are generally used to generate a strong radar echo from objects that would otherwise have only very low effective radar cross section (RCS). A corner reflector includes two or more electrically conductive surfaces that are mounted crosswise (e.g., at an angle of exactly 90 degrees). Incoming electromagnetic waves are backscattered by multiple reflection accurately in that direction from which they come. Thus, even small objects with small RCS yield a strong echo.

In some implementations, printed radar reflectors comprise simple aluminum fibers that form half-wave resonators within the object to be tracked (e.g., a piece of paper). The radar-reflecting fibers are approximately the same diameter as paper fibers (typically 6.5 mm long and 1.5 μm in diameter). Randomly oriented radar-reflecting fibers provide a unique backscatter pattern that can be read and stored in a database for future identification. Ordered patterns can also be designed so that individual resonators are coupled or decoupled, whatever is likely to give the optimum backscatter pattern. When illuminated with radar, the backscattered fields interact to create a unique interference pattern that enables one tagged object to be identified and differentiated from other tagged objects.

In some implementations, electronic tags 206 are active radar devices capable of transmitting radio frequency tones or pulses independent of any received waves. In various implementations, electronic tags 206 are capable of reflecting, amplifying, and/or modulating received radio waves. Active radar devices comprise single transistor devices, MEMS-based devices, and mechanical gated (shuttered) devices.

In some implementations, electronic tags 206 are configured to communicate via radar in response to enablement commands received via a communications channel (e.g., an RFID channel) from a smart device, such as smart device 204-6 in FIG. 2. In some implementations, electronic tags 206 are configured to communicate via radar at particular intervals, such as intervals preset by a smart device. For example, electronic tags 206-1 and 206-2 are configured by device 204-6 such that only one of the tags is communicating via radar at any given time. In some implementations, electronic tags 206 are configured to communicate via radar in response to detecting a change in the environment, such as motion of the object to which the electronic tag is affixed. For example, in some embodiments, electronic tags 206 include one or more of: a humidity sensor; a temperature sensor; an accelerometer; a gyroscope; and/or an optical sensor. In this example, the tags are configured to communicate via radar in response to changes detected by one or more of the sensors.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
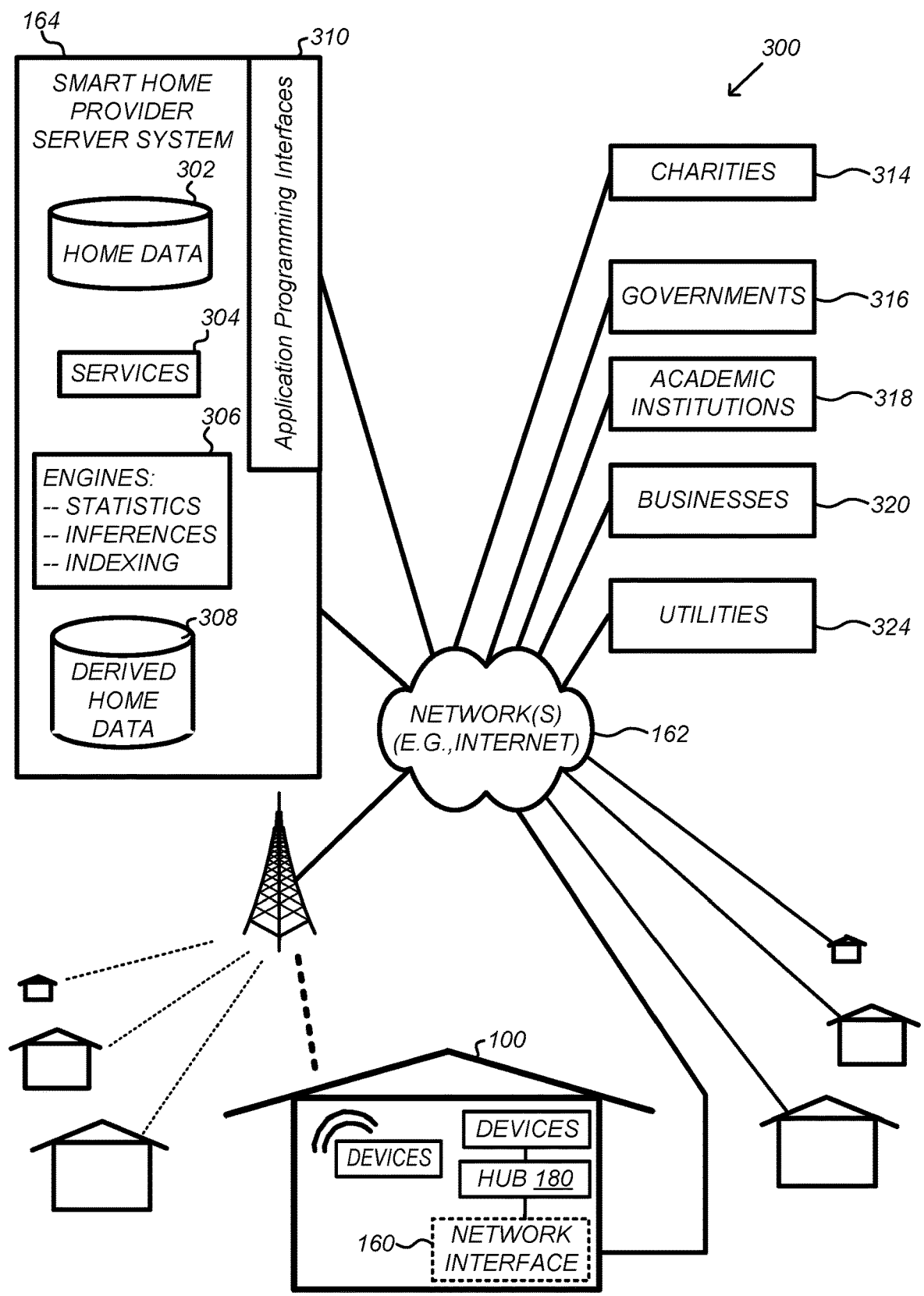
FIG. 3 is a network-level view illustrating an extensible devices and services platform with which the smart home environment of FIG. 1 is integrated, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, usage statistics, usage statistics relative to use of other devices, usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
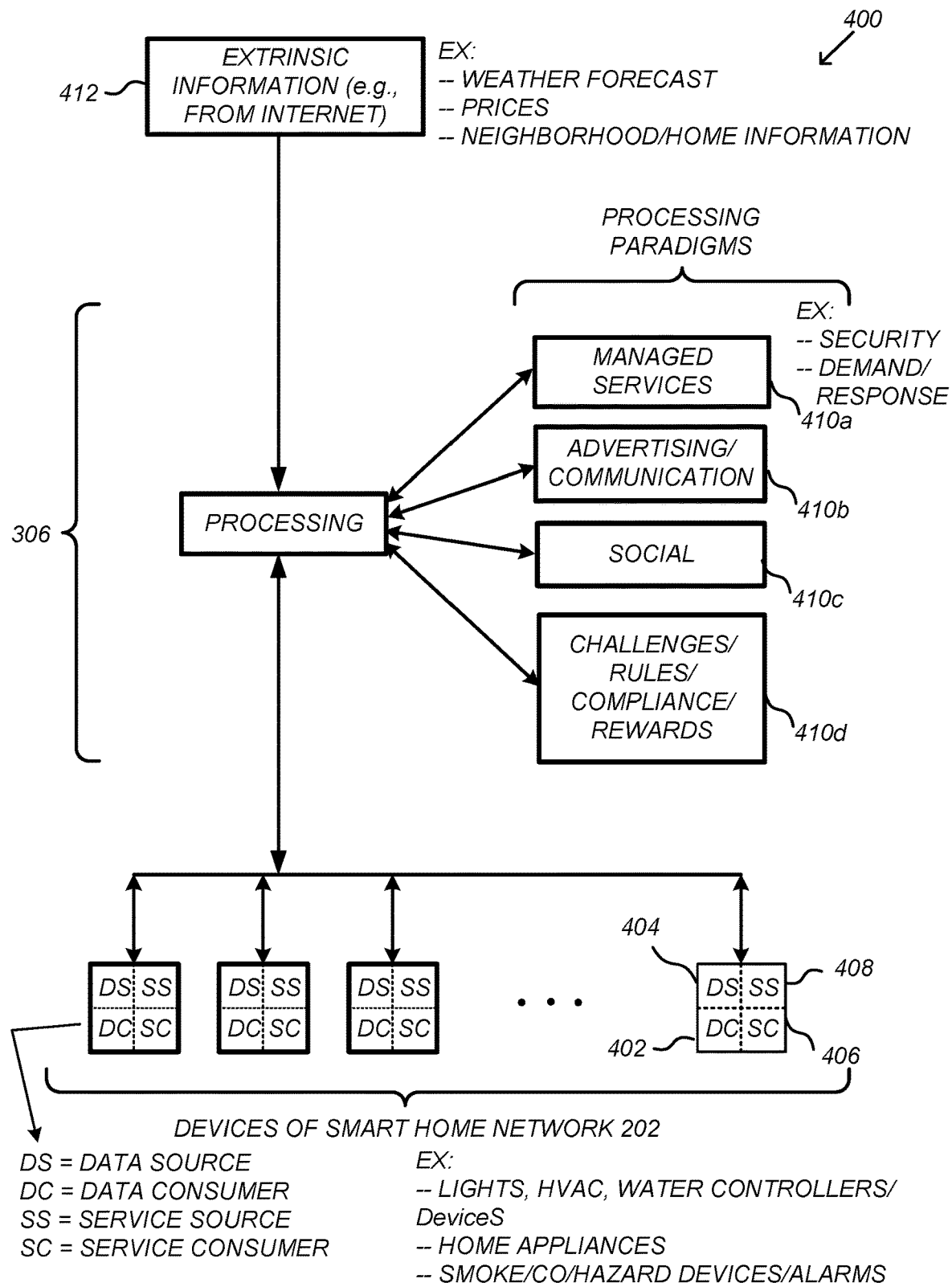
FIG. 4 is an abstracted functional view illustrating the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
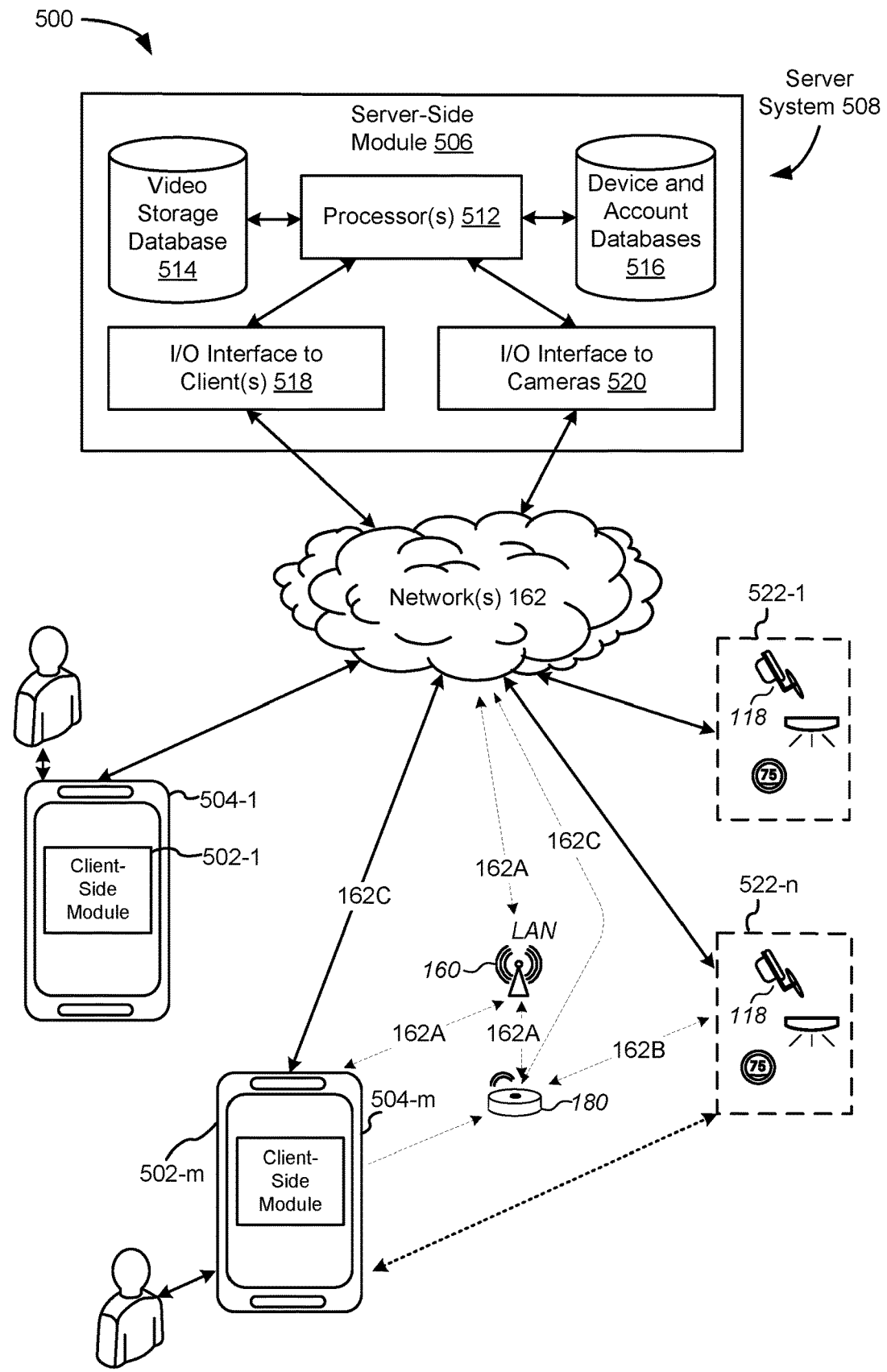
FIG. 5 is a representative operating environment in which a server system interacts with client devices and hub devices communicatively coupled to local smart devices, in accordance with some implementations.

FIG. 5 illustrates a representative operating environment 500 in which a server system 508 provides data processing for one or more smart devices, such as one or more cameras 118. In some implementations, the server system 508 monitors and facilitates review of motion events in video streams captured by video cameras 118. In some implementations, server system 508 monitors and facilitates review of radar events detected by one or more radar-equipped smart devices. As shown in FIG. 5, in some implementations, the server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the server system 508. In some implementations, the server system 508 includes a dedicated video processing server that provides video processing services to video sources and client devices 504 independent of other services provided by the server system 508. In some implementations, the server system 508 includes a dedicated radar processing server that provides radar processing services for various radar-equipped devices and client device 504.

In some implementations, each of the video sources 522 includes one or more video cameras 118 that capture video and send the captured video to the server system 508 substantially in real-time. In some implementations, each of the video sources 522 optionally includes a controller device (not shown) that serves as an intermediary between the one or more cameras 118 and the server system 508. The controller device receives the video data from the one or more cameras 118, optionally, performs some preliminary processing on the video data, and sends the video data to the server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the server system 508. In some implementations, the captured video is stored in a local storage (not shown) prior to being uploaded to the server system 508.

As shown in FIG. 5, in accordance with some implementations, each of the client devices 504 includes a client-side module 502. The client-side module 502 communicates with a server-side module 506 executed on the server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 508 is implemented on one or more standalone data processing apparatuses or a distributed network of computers. In some implementations, the server system 508 also employs various virtual devices and/or services of third party service providers (e.g., third-party cloud service providers) to provide the underlying computing resources and/or infrastructure resources of the server system 508. In some implementations, the server system 508 includes, but is not limited to, a handheld computer, a tablet computer, a laptop computer, a desktop computer, or a combination of any two or more of these data processing devices or other data processing devices.

The server-client environment 500 shown in FIG. 1 includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the server system 508 can vary in different implementations. For example, in some implementations, client-side module 502 is a thin-client that provides only user-facing input and output processing functions, and delegates all other data processing functionalities to a backend server (e.g., the server system 508). Similarly, in some implementations, a respective one of the video sources 522 is a simple video capturing device that continuously captures and streams video data to the server system 508 without no or limited local preliminary processing on the video data. Although many aspects of the present technology are described from the perspective of the server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the server system 508, the client device 504, and the video sources 522 cooperatively.

It should be understood that operating environment 500 that involves the server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-m) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-n exchange data with the hub device 180. Alternatively, in some situations, some of the electronic devices of the video sources 522-n communicate with the network interface device 160 directly via the same sub-network 162A that couples devices 160, 180 and 504-m. In some implementations (e.g., in the network 162C), both the client device 504-m and the electronic devices of the video sources 522-n communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-n. As explained above, the network interface device 160 and the hub device 180 optionally communicate with each other via a sub-network 162A.

Figure 6:
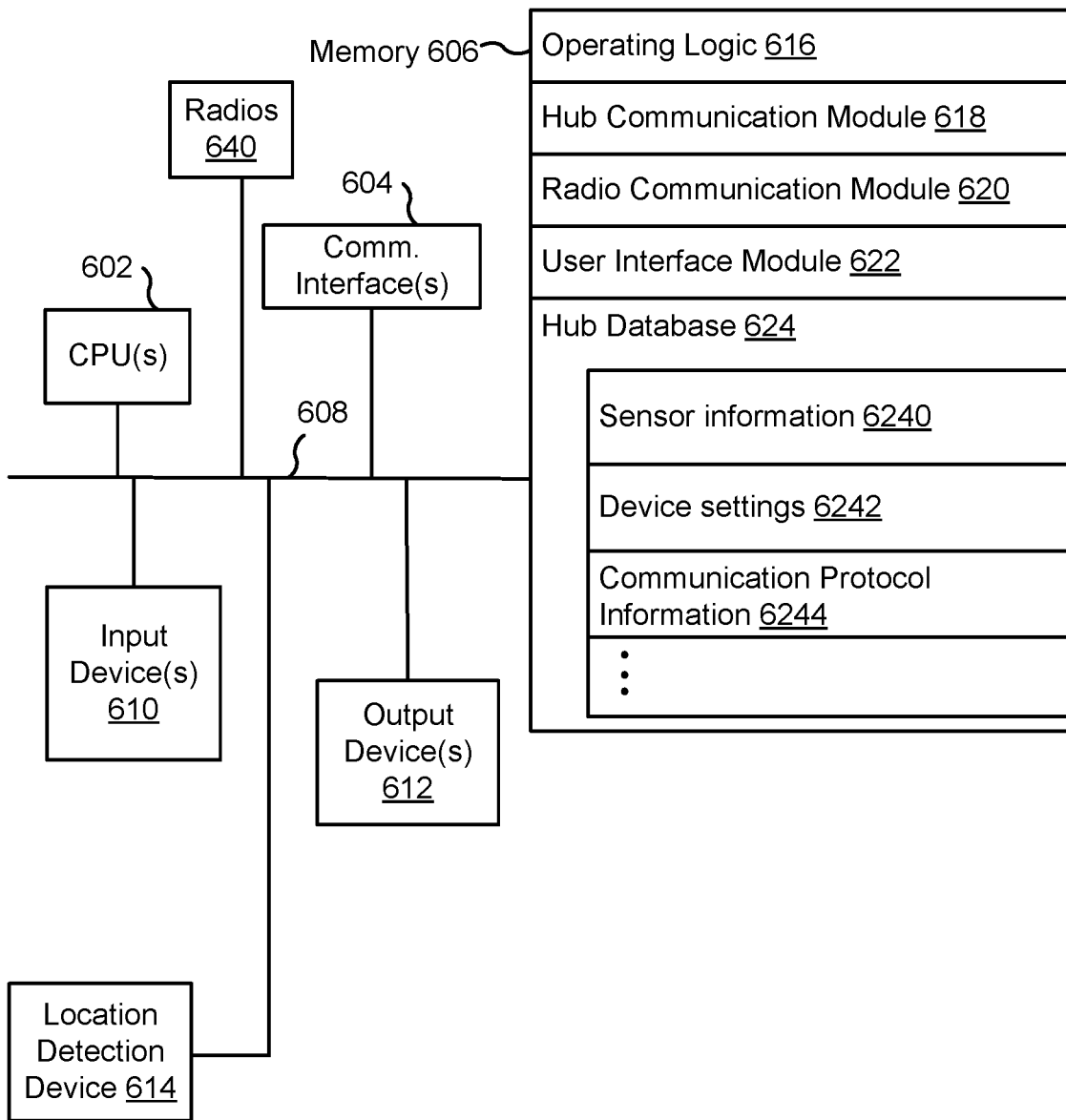
FIG. 6 is a block diagram illustrating a representative hub device, in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, and one or more communication buses 608 for interconnecting these components (sometimes called a chipset). In some implementations, the hub device 180 includes one or more input devices 610 such as one or more buttons for receiving input. In some implementations, the hub device 180 includes one or more output devices 612 such as one or more indicator lights, a sound card, a speaker, a small display for displaying textual information and error codes, etc. Furthermore, in some implementations, the hub device 180 uses a microphone and voice recognition or a camera and gesture recognition to supplement or replace the keyboard. In some implementations, the hub device 180 includes a location detection device 614, such as a GPS (global positioning satellite) or other geo-location receiver, for determining the location of the hub device 180.

The hub device 180 optionally includes one or more built-in sensors (not shown), including, for example, one or more thermal radiation sensors, ambient temperature sensors, humidity sensors, IR sensors, radar, occupancy sensors (e.g., using RFID sensors), ambient light sensors, motion detectors, accelerometers, and/or gyroscopes.

The radios 640 enable and/or connect to one or more radio communication networks in the smart home environments, and allow a hub device to communicate with smart devices 204. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. In some implementations, the radios 640 include multiple different physical radios, each of which implements a different communication protocol. For example, in some implementations the radios 640 include a Wi-Fi radio, a Bluetooth radio and an IEEE 802.15.4 radio, all of which operate at 2.4 GHz. In some implementations, the radios 640 include one or more radar transceivers. In some implementations, some of the radios are combined. For example, in some implementations, a Bluetooth radio and a Wi-Fi radio are incorporated in a single chip coupled to a single antenna. In other implementations, a Bluetooth radio and an IEEE 802.15.4 radio are incorporated in a single chip coupled to a single antenna. Any combination of these radios can be implemented in any of the smart devices employed in a smart home environment.

In some implementations, hub device 180 includes a radar subsystem. In some implementations, the radar subsystem uses radio waves (also sometimes called radar signals) to determine the range, angle, position, or velocity of objects. In some implementations, the radar subsystem transmits radio waves (or microwaves) that reflect from objects in their path. The radar subsystem further receives and processes the reflected waves to determine properties of the objects. In some implementations, the radar subsystem includes one or more communication modules (e.g., radio communication module 620) in memory 606, one or more radios 640, and/or one or more communication interfaces 604.

Communication interfaces 604 include, for example, hardware capable of interfacing the one or more radios 640 with the hub device 180, so as to enable data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. In some implementations, communication interfaces 604 include one or more antennas for transmitting and receiving signals as governed by radios 640.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer-readable storage medium. In some implementations, memory 606, or the non-transitory computer-readable storage medium of memory 606, stores the following programs, modules, and data structures, or a subset or superset thereof:

- Operating logic 616 including procedures for handling various basic system services and for performing hardware dependent tasks;
- Hub device communication module 618 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);
- Radio communication module 620 for connecting the hub device 180 to other devices (e.g., controller devices, smart devices 204 in smart home environment 100, client devices 504, and/or electronic tags) via one or more radio communication devices (e.g., radios 640);
- User interface module 622 for providing and displaying a user interface in which settings, captured data, and/or other data for one or more devices (e.g., smart devices 204 in smart home environment 100) can be configured and/or viewed; and
- Hub device database 624, including but not limited to:
  - Sensor information 6240 for storing and managing data received, detected, and/or transmitted by one or more sensors of the hub device 180 and/or one or more other devices (e.g., smart devices 204 in smart home environment 100);
  - Device settings 6242 for storing operational settings for one or more devices (e.g., coupled smart devices 204 in smart home environment 100), such as device identifications, timing settings, radar settings, operational modes, and/or preference settings; and
  - Communication protocol information 6244 for storing and managing protocol information for one or more protocols (e.g., standard wireless protocols, such as ZigBee, Z-Wave, etc., and/or custom or standard wired protocols, such as Ethernet).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

FIG. 7A is a block diagram illustrating the server system 508 in accordance with some implementations. The server system 508, typically, includes one or more processing units (CPUs) 702, one or more network interfaces 704 (e.g., including an I/O interface to one or more client devices and an I/O interface to one or more electronic devices), memory 706, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer-readable storage medium. In some implementations, memory 706, or the non-transitory computer-readable storage medium of memory 706, stores the following programs, modules, and data structures, or a subset or superset thereof:

- Operating system 710 including procedures for handling various basic system services and for performing hardware dependent tasks;
- Network communication module 712 for connecting the server system 508 to other systems and devices (e.g., client devices, electronic devices, and systems connected to one or more networks 162, FIGS. 1-5) via one or more network interfaces 704 (wired or wireless);
- Server-side module 714, which provides server-side functionalities for device control, data processing and data review, including but not limited to:
  - Data receiving module 7140 for receiving data from electronic devices (e.g., video data from a camera 118 and/or radar information from a radar-equipped device), and preparing the received data for further processing and storage in the data storage database 7160;
  - Hub and device control module 7142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;
  - Data processing module 7144 for processing the data provided by the electronic devices, and/or preparing and sending processed data to a device for review (e.g., client devices 504 for review by a user), including but not limited to:
    - Radar processing module 7145 for processing radar data provided by radar-equipped devices, such as classifying radar events and identifying radar-detected entities;
    - Video processing module 7146 processing video data provided by one or more cameras, such as classifying motion events and identifying motion entities; and
    - User interface sub-module 7150 for communicating with a user (e.g., sending alerts, timeline events, etc. and receiving user edits and zone definitions and the like); and
- Server database 716, including but not limited to:
  - Data storage database 7160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the hub device 180 or smart devices are stored securely;
  - Account database 7162 for storing account information for user accounts, including user account information such as user profiles 7163, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;
  - Device information database 7164 for storing device information related to one or more devices such as device profiles 7165, e.g., device identifiers and hub device specific secrets, independently of whether the corresponding hub devices have been associated with any user account;
  - Event information database 7166 for storing event information such as event records 7168, e.g., event log information, event categories, and the like;
  - Tag information database 7170 for storing tag information for one or more electronic tags, e.g., tag identifiers, tag signal timing, tag location information, and the like;
  - Radar information database 7172 for storing radar information for one or more smart devices, e.g., radar band and/or mode information, historical radar data, radar object modeling information, and the like; and
  - Device timing information 7174 for storing timing information for one or more smart device, e.g., timing synchronization information for synchronizing various smart devices.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 7B:
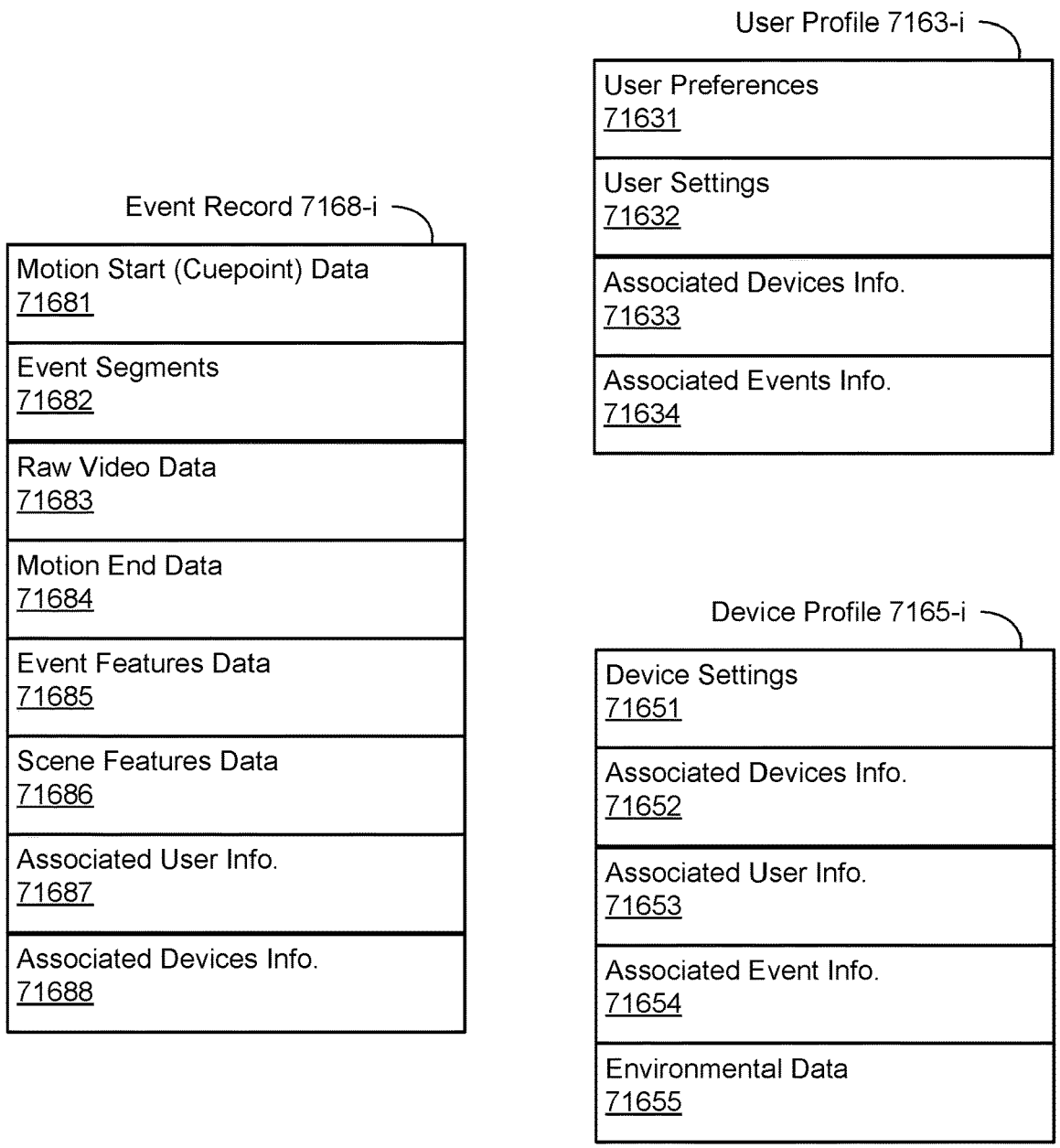
FIG. 7B is a block diagram illustrating various data structures used in some implementations.

FIG. 7B illustrates various data structures used by some implementations, including an event record 7168-*i*, a user profile 7163-*i*, and a device profile 7165-*i*. The event record 7168-*i* corresponds to a motion event i and data for the motion event i. In some instances, the data for motion event i includes motion start (also sometimes called cuepoint) data 71681, event segments data 71682, raw video data 71683, motion end data 71684, event features data 71685, scene features data 71686, associated user information 71687, and associated devices information 71688. In some instances, the event record 7168-*i* includes only a subset of the above data. In some instances, the event record 7168-*i* includes additional event data not shown such as data regarding event/motion masks.

Motion start data 71681 includes date and time information such as a timestamp and optionally includes additional information such as information regarding the amount of motion present and/or the motion start location. Similarly, motion end data 71684 includes date and time information such as a timestamp and optionally includes additional information such as information regarding the amount of motion present and/or the motion end location.

Event segments 71682 includes information regarding segmentation of motion event i. In some instances, event segments are stored separately from the raw video data 71683. In some instances, the event segments are stored at a lower display resolution than the raw video data. For example, the event segments are optionally stored at 480p or 780p and the raw video data is stored at 1080i or 1080p. Storing the event segments at a lower display resolution enables the system to devote less time and resources to retrieving and processing the event segments. In some instances, the event segments are not stored separately and the segmentation information includes references to the raw video data 71683 as well as date and time information for reproducing the event segments.

Event features data 71685 includes information regarding event features such as event categorizations/classifications, object masks, motion masks, identified/recognized/tracked motion objects (also sometimes called blobs), information regarding features of the motion objects (e.g., object color, object dimensions, velocity, size changes, etc.), information regarding activity in zones of interest, and the like. Scene features data 71686 includes information regarding the scene in which the event took place such as depth map information, information regarding the location of windows, televisions, fans, the ceiling/floor, etc., information regarding whether the scene is indoors or outdoors, information regarding zones of interest, and the like.

Associated user information 71687 includes information regarding users associated with the event such as users identified in the event, users receiving notification of the event, and the like. In some instances, the associated user information 71687 includes a link, pointer, or reference to a user profile 7163 for to the user. Associated devices information 71688 includes information regarding the device or devices involved in the event (e.g., a camera 118 that recorded the event). In some instances, the associated devices information 71688 includes a link, pointer, or reference to a device profile 7165 for the device.

The user profile 7163-*i* corresponds to a user i associated with the smart home network (e.g., smart home network 202) such as a user of a hub device 204, a user identified by a hub device 204, a user who receives notifications from a hub device 204 or from the server system 508, and the like. In some instances, the user profile 7163-*i* includes user preferences 71631, user settings 71632, associated devices information 71633, and associated events information 71634. In some instances, the user profile 7163-*i* includes only a subset of the above data. In some instances, the user profile 7163-*i* includes additional user information not shown such as information regarding other users associated with the user i.

The user preferences 71631 include explicit user preferences input by the user as well as implicit and/or inferred user preferences determined by the system (e.g., server system 508 and/or client device 504). In some instances, the inferred user preferences are based on historical user activity and/or historical activity of other users. The user settings 71632 include information regarding settings set by the user i such as notification settings, device settings, and the like. In some instances, the user settings 71632 include device settings for devices associated with the user i.

Associated devices information 71633 includes information regarding devices associated with the user i such as devices within the user's smart home environment 100 and/or client devices 504. In some instances, associated devices information 71633 includes a link, pointer, or reference to a corresponding device profile 7165. Associated events information 71634 includes information regarding events associated with user i such as events in which user i was identified, events for which user i was notified, events corresponding to user i's smart home environment 100, and the like. In some instances, the associated events information 71634 includes a link, pointer, or reference to a corresponding event record 7168.

The device profile 7165-*i* corresponds to a device i associated with a smart home network (e.g., smart home network 202) such a hub device 204, a camera 118, a client device 504, and the like. In some instances, the device profile 7165-*i* includes device settings 71651, associated devices information 71652, associated user information 71653, associated event information 71654, and environmental data 71655. In some instances, the device profile 7165-*i* includes only a subset of the above data. In some instances, the device profile 7165-*i* includes additional device information not shown such as information regarding whether the device is currently active.

Device settings 71651 include information regarding the current settings of device i such as positioning information, mode of operation information, and the like. In some instances, the device settings 71651 are user-specific and are set by respective users of the device i. Associated devices information 71652 includes information regarding other devices associated with device i such as other devices linked to device i and/or other devices in the same smart home network as device i. In some instances, associated devices information 71652 includes a link, pointer, or reference to a respective device profile 7165 corresponding to the associated device.

Associated user information 71653 includes information regarding users associated with the device such as users receiving notifications from the device, users registered with the device, users associated with the smart home network of the device, and the like. In some instances, associated user information 71653 includes a link, pointer, or reference to a user profile 7163 corresponding to the associated user.

Associated event information 71654 includes information regarding events associated with the device i such as historical events involving the device i. In some instances, associated event information 71654 includes a link, pointer, or reference to an event record 7168 corresponding to the associated event.

Environmental data 71655 includes information regarding the environment of device i such as information regarding whether the device is outdoors or indoors, information regarding the light level of the environment, information regarding the amount of activity expected in the environment (e.g., information regarding whether the device is in a private residence versus a busy commercial property), information regarding environmental objects (e.g., depth mapping information for a camera), and the like.

Figure 8:
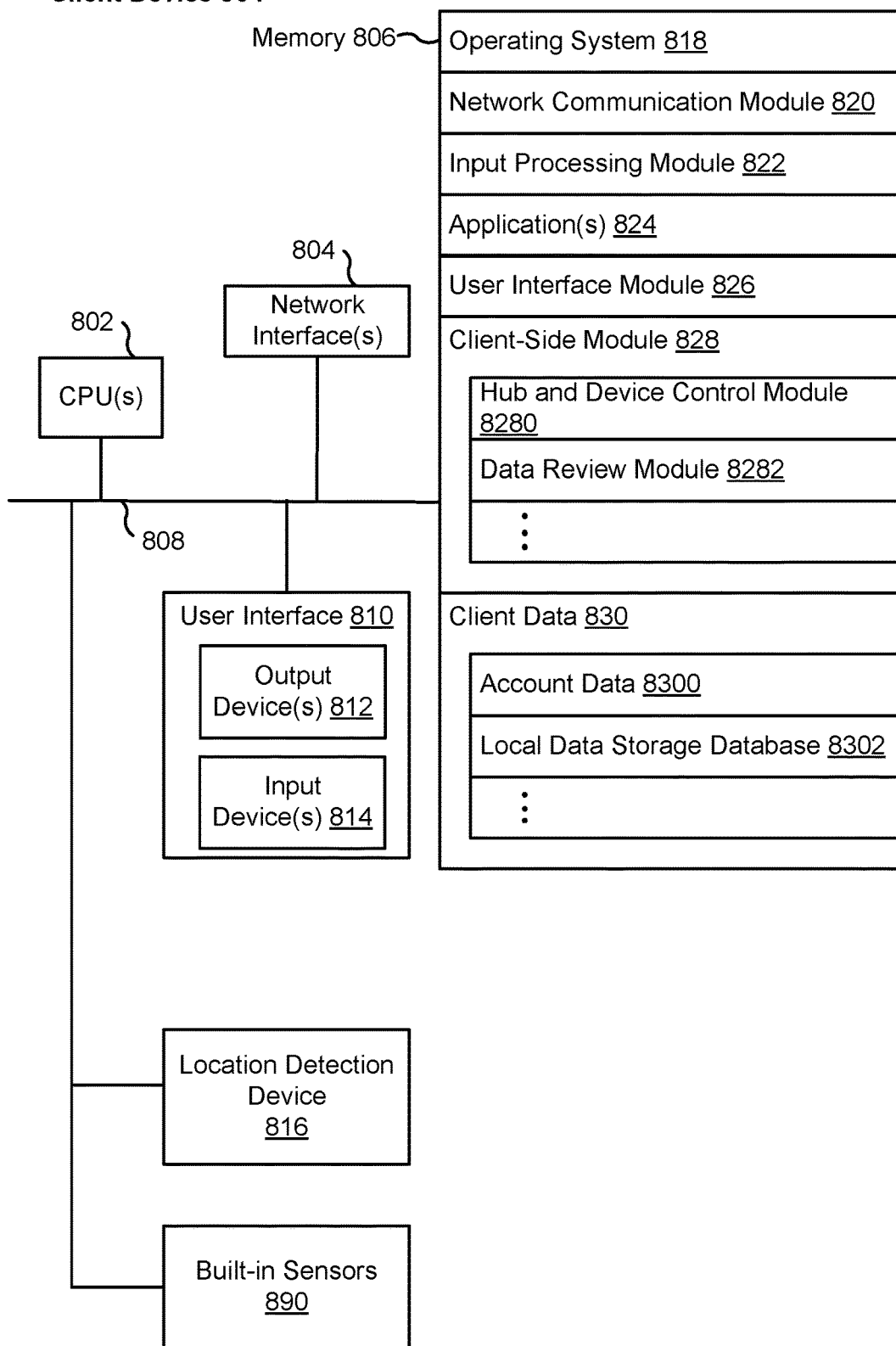
FIG. 8 is a block diagram illustrating a representative client device associated with a user account, in accordance with some implementations.

FIG. 8 is a block diagram illustrating a representative client device 504 associated with a user account in accordance with some implementations. The client device 504, typically, includes one or more processing units (CPUs) 802, one or more network interfaces 804, memory 806, and one or more communication buses 808 for interconnecting these components (sometimes called a chipset). Optionally, the client device also includes a user interface 810 and one or more built-in sensors 890 (e.g., accelerometer and gyroscope). User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 816, such as a GPS (global positioning satellite) or other geo-location receiver, for determining the location of the client device.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer-readable storage medium. In some implementations, memory 806, or the non-transitory computer-readable storage medium of memory 806, stores the following programs, modules, and data structures, or a subset or superset thereof:

Operating system 818 including procedures for handling various basic system services and for performing hardware dependent tasks;

Network communication module 820 for connecting the client device 504 to other systems and devices (e.g., client devices, electronic devices, and systems connected to one or more networks 162, FIGS. 1-5) via one or more network interfaces 804 (wired or wireless);

Input processing module 822 for detecting one or more user inputs or interactions from one of the one or more input devices 814 and interpreting the detected input or interaction;

One or more applications 824 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);

User interface module 622 for providing and displaying a user interface in which settings, captured data, and/or other data for one or more devices (e.g., smart devices 204 in smart home environment 100) can be configured and/or viewed;

Client-side module 828, which provides client-side functionalities for device control, data processing and data review, including but not limited to:

Hub device and device control module 8280 for generating control commands for modifying an operating mode of the hub device or the electronic devices in accordance with user inputs; and Data review module 8282 for providing user interfaces for reviewing data processed by the server system 508; and Client data 830 storing data associated with the user account and electronic devices, including, but is not limited to:

Account data 8300 storing information related to both user accounts loaded on the client device and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and Local data storage database 8302 for selectively storing raw or processed data associated with electronic devices (e.g., of the video sources 522, such as a camera 118).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

In some implementations, client device 504 includes one or more graphical user interfaces and/or one or more modules for registering smart devices and/or electronic tags in the smart home environment. In some implementations, client device 504 includes an application, such as a smart home application, for interacting with a smart home environment. In some implementations, the smart home application includes one or more user interfaces for one or more of the following: registering smart device(s), registering electronic tag(s), adjusting operation of smart device(s), reviewing data from smart device(s), and the like. In some implementations, the smart home application includes user interface module 826 and client-side module 828.

Figure 9A:
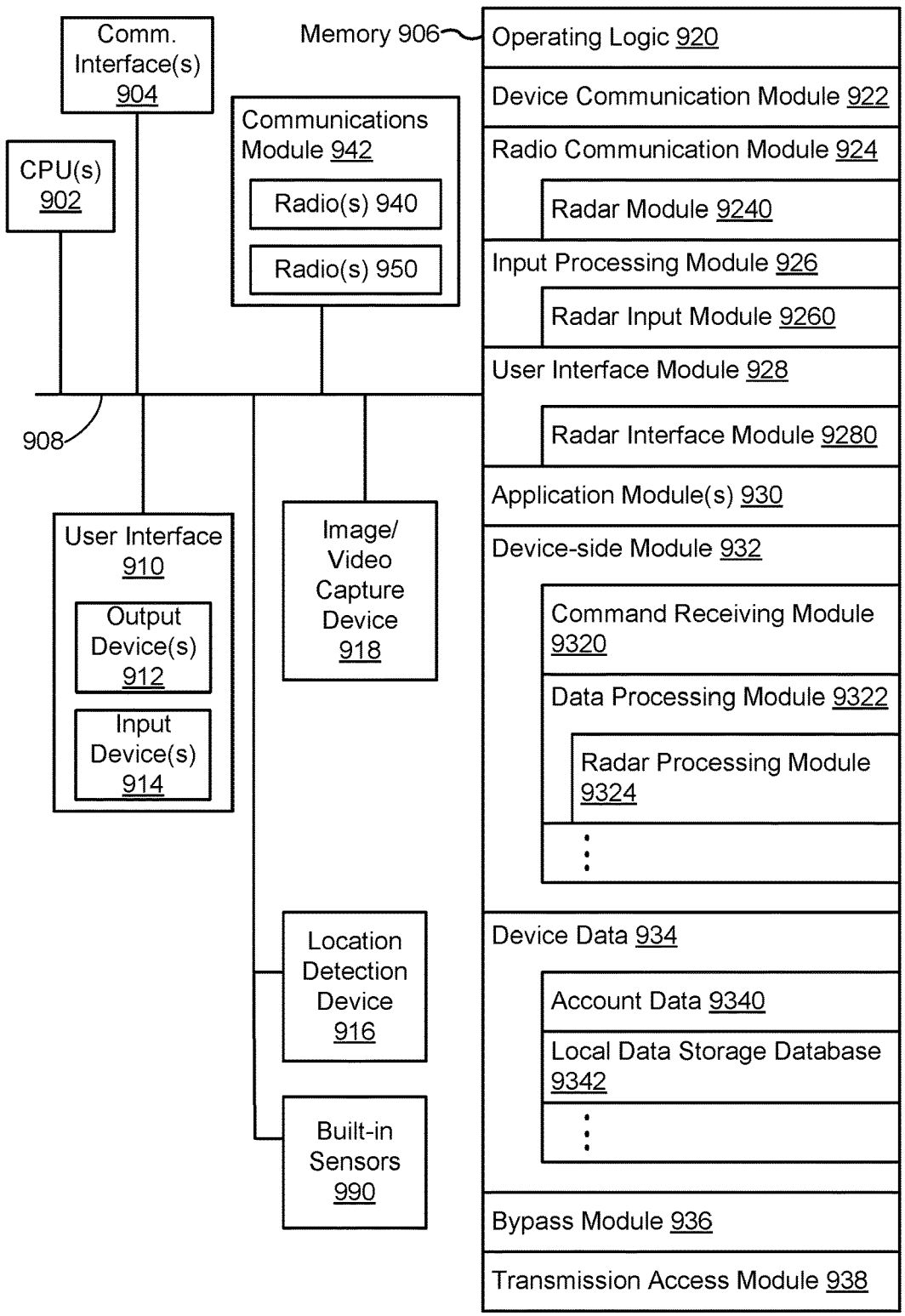
FIG. 9A is a block diagram illustrating a representative smart device, in accordance with some implementations.

FIG. 9A is a block diagram illustrating a representative smart device 204 in accordance with some implementations. In some implementations, the smart device 204 (e.g., any device of a smart home environment 100 (FIGS. 1 and 2), such as a camera 118, a smart hazard detector 104, a smart thermostat 102, hub device 180, etc.) includes one or more processing units (e.g., CPUs, ASICs, FPGAs, microprocessors, and the like) 902, memory 906, a communications module 942 that includes one or more radio(s) 940 and radio(s) 950, communication interfaces 904, and one or more communication buses 908 for interconnecting these components (sometimes called a chipset). In some implementations, user interface 910 includes one or more output devices 912 that enable presentation of media content, including one or more speakers and/or one or more visual displays. In some implementations, user interface 910 also includes one or more input devices 914, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 918 (e.g., cameras, video cameras, scanners, photo sensor units). Optionally, the client device includes a location detection device 916, such as a GPS (global positioning satellite) or other geo-location receiver, for determining the location of the smart device 204.

The built-in sensors 990 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radio(s) 940 and radio(s) 950 enable one or more radio communication networks in the smart home environments, and allow a smart device 204 to communicate with other devices. In some implementations, the radio(s) 940 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. In some implementations, radio(s) 940 and/or radio(s) 950 are utilized for radar communications.

Communication interfaces 904 include, for example, hardware capable of interfacing the one or more radio(s) 940 and 950 with the smart device 204, so as to enable data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. In some implementations, each radio(s) 940 and radio(s) 950 has a respective communication interface 904 for facilitating and managing data communications for the respective radio, while in other implementations, multiple radio(s) 940 and/or 950 are managed by a single communication interface 904.

In some implementations, radio(s) 940 and/or radio(s) 950 are configured to transmit and receive the same or distinct types of signals in the smart home environment. For example, radio(s) 940 may include transceivers configured to transmit data between other devices (e.g., smart devices) within the smart home environment (e.g., IEEE 802.15.4 communications protocol for unilaterally/bilaterally transmitting data between and among smart devices). Signals transmitted between devices optionally include, for example, signals directed to critical hazard information (e.g., pings indicating the detection of smoke) or device status information (e.g., ping indicating low battery). In contrast, in some implementations, the radio(s) 950 may include transceivers configured to transmit high-bandwidth data across data networks (e.g., IEEE 802.11 Wi-Fi for uploading a video stream to a smart home provider server system 164). In some implementations, the radio(s) 940 and/or the radio(s) 950 include transceivers configured for close-range communications with devices (e.g., Bluetooth communications protocol for device provisioning). In some implementations, the radio(s) 940 and/or the radio(s) 950 include transceivers configured to transmit low-power signals (e.g., smart hazard detectors 104 not connected to a persistent power source). In some implementations, radio(s) 940 and/or radio(s) 950 are configured to transmit multiple types of signals in the smart home environment (e.g., a Wi-Fi radio 950 uploads video stream data to the smart home provider server system 164, in addition to routing received beacons to other nearby smart devices). In some implementations, the radio(s) 940 and/or the radio(s) 950 of a respective device include transceivers for directly and communicably bridging the respective device to other devices. For example, pairing devices directly via Bluetooth, rather than communicating via a router by using Wi-Fi. In some implementations, the radio(s) 940 and/or the radio(s) 950 are configured to translate signals received through a first radio 940, and further to re-transmit the translated signals using the first radio 940 and/or a radio 950 (e.g., a proprietary message format is received via Bluetooth and translated, where the translated messages are re-transmitted to other devices using Wi-Fi).

In some implementations, the radio(s) 940 and/or the radio(s) 950 include transceivers configured to transmit data via RFID (e.g., for use in identifying electronic tags and/or other devices). In some implementations, the radio(s) 940 and/or the radio(s) 950 include transceivers configured for radar operations (e.g., for use in determining distances, velocities, and the like). In some implementations, the radio(s) 940 and/or the radio(s) 950 are configured for radar operations via one or more radio frequency bands, such as 3-10 GHz, 24-24.5 GHz, 57-64 GHz, and/or 77-81 GHz.

The communications module 942 includes a variety of components for enabling the receiving and transmitting of signals by a respective smart device 204, including one or more amplifiers, oscillators, antennas, filters, switches, memory, firmware, and/or any other support circuits or circuit components. In some implementations, the one or more radio(s) 940 and radio(s) 950 are integrated components of the communications module 942 (e.g., System on a Chip (SOC)). In some implementations, the one or more radio(s) 940 and radio(s) 950 have respective circuit components. Alternatively, the one or more radio(s) 940 and radio(s) 950 share one or more circuit components.

In some implementations, the communications module 942 includes a 1-D radar subsystem having one transmitter and one receiver. In some implementations, the communications module 842 includes a multi-dimensional radar subsystem. For example, in some implementations, the communications module 842 includes two radar transmitters and four radar receivers.

Memory 906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, or alternatively the non-volatile memory within memory 906, includes a non-transitory computer-readable storage medium. In some implementations, memory 906, or the non-transitory computer-readable storage medium of memory 906, stores the following programs, modules, and data structures, or a subset or superset thereof:

Operating logic 920 including procedures for handling various basic system services and for performing hardware dependent tasks;

Device communication module 922 for connecting to and communicating with other network devices (e.g., network interface 160, such as a router that provides Internet connectivity, networked storage devices, network routing devices, server system 508, etc.) connected to one or more networks 162 via one or more communication interfaces 904 (wired or wireless);

Radio communication module 924 for connecting the smart device 204 to other devices (e.g., controller devices, smart devices 204 in smart home environment 100, client devices 504) utilizing radio communication in conjunction with communications module 942, including, but not limited to:

Radar module 9240 for sending, receiving, and/or manipulating radar signals (e.g., in conjunction with communications module 942 and/or communications interface 904);

Input processing module 926 for detecting one or more user inputs or interactions from the one or more input devices 914 and interpreting the detected inputs or interactions, including, but not limited to:

Radar input module 9260 for detecting one or more user inputs or interactions via radar and/or interpreting the detected inputs or interactions;

User interface module 928 for providing and displaying a user interface in which settings, captured data, and/or other data for one or more devices (e.g., the smart device 204, and/or other devices in smart home environment 100) can be configured and/or viewed, including, but not limited to:

Radar interface module 9280 for providing a user interface responsive to one or more user inputs or interactions detected via radar (e.g., detected by radar input module 9260);

One or more application modules 930 for execution by the smart device 930 (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);

Device-side module 932, which provides device-side functionalities for device control, data processing and data review, including but not limited to:

Command receiving module 9320 for receiving, forwarding, and/or executing instructions and control commands (e.g., from a client device 504, from a smart home provider server system 164, from user inputs detected on the user interface 910, etc.) for operating the smart device 204; and Data processing module 9322 for processing data captured or received by one or more inputs (e.g., input devices 914, image/video capture devices 918, location detection device 916), sensors (e.g., built-in sensors 990), interfaces (e.g., communication interfaces 904, radio(s) 940), and/or other components of the smart device 204, and for preparing and sending processed data to a device for review (e.g., client devices 504 for review by a user), including but not limited to:

Radar processing module 9324 for processing radar data captured or received by the smart device 204, such as classifying radar events, recognizing radar entities, and/or aggregating radar data with data from other sensors (e.g., video data);

Device data 934 storing data associated with devices (e.g., the smart device 204), including but not limited to:

Account data 9340 storing information related to user accounts loaded on the smart device 204, wherein such information includes cached login credentials, smart device identifiers (e.g., MAC addresses and UUIDs), user interface settings, display preferences, authentication tokens and tags, password keys, etc.; and Local data storage database 9342 for selectively storing raw or processed data associated with the smart device 204 (e.g., captured video footage and/or radar data);

Bypass module 936 for detecting whether radio(s) 940 and/or radio(s) 950 are transmitting signals via respective antennas coupled to the radio(s) 940 and/or radio(s) 950, and to accordingly couple radio(s) 940 and/or radio(s) 950 to their respective antennas either via a bypass line or an amplifier; and Transmission access module 938 for granting or denying transmission access to one or more radio(s) 940 and/or radio(s) 950 (e.g., based on detected control signals and transmission requests).

Each of the above identified elements may be stored in one or more of the previously mentioned memory devices, and corresponds to a set of instructions for performing a function described above. For example, in some implementations, the one or more radio(s) 940 and radio(s) 950 include respective memory and firmware for storing one or more programs/executable modules of the memory 906. The above identified modules or programs (i.e., sets of instructions) need not be implemented as separate software programs, procedures, or modules, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above, such as a video processing module.

Figure 9B:
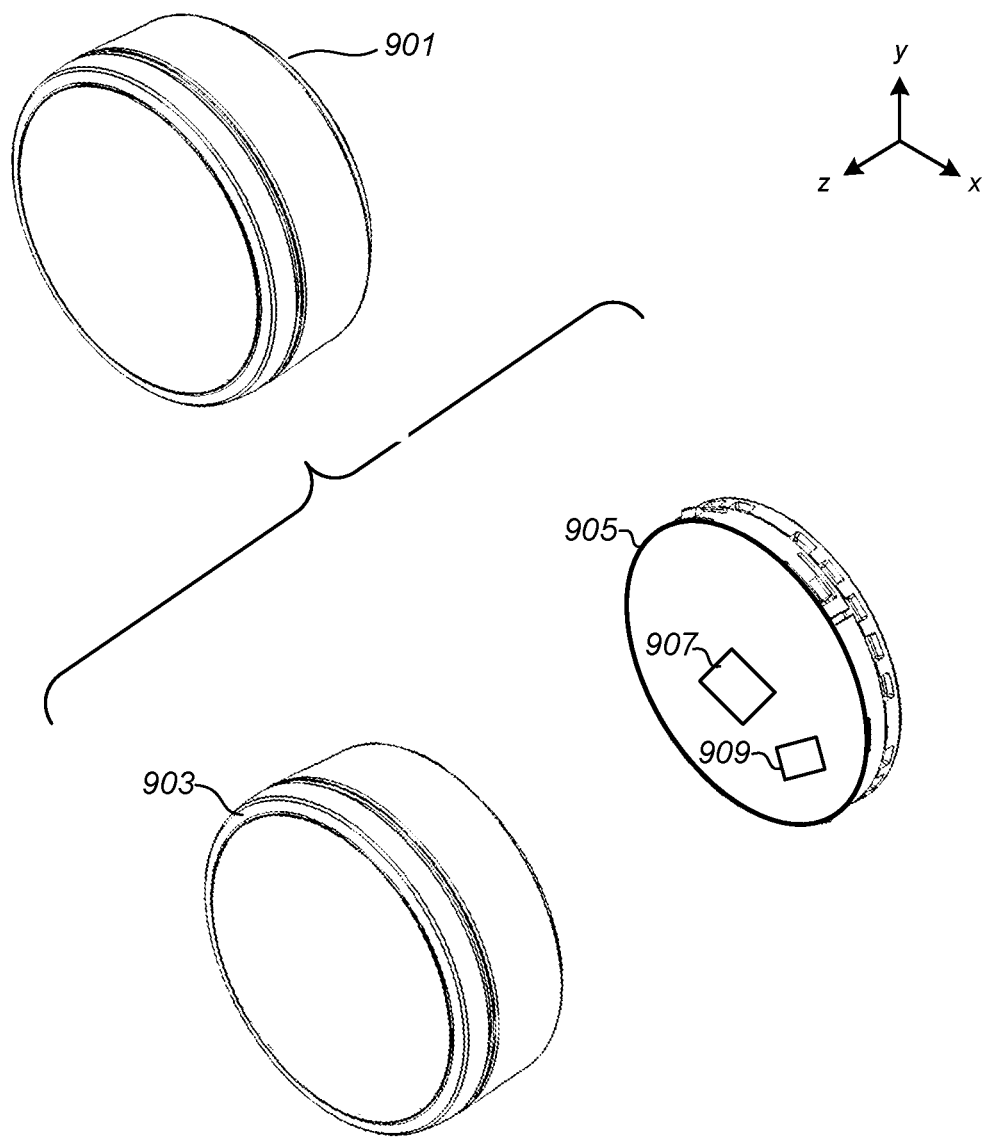
FIGS. 9B-9D are component views illustrating representative smart devices, in accordance with some implementations.
Figure 9C:
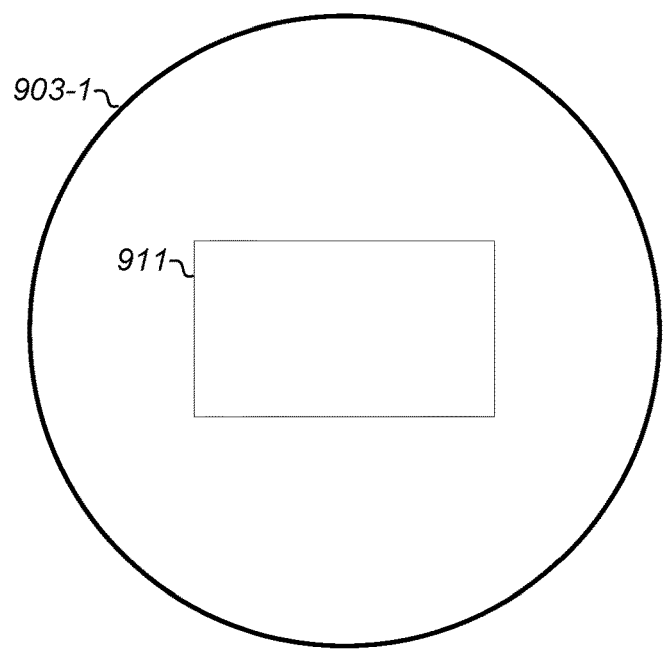
Figure 9D:
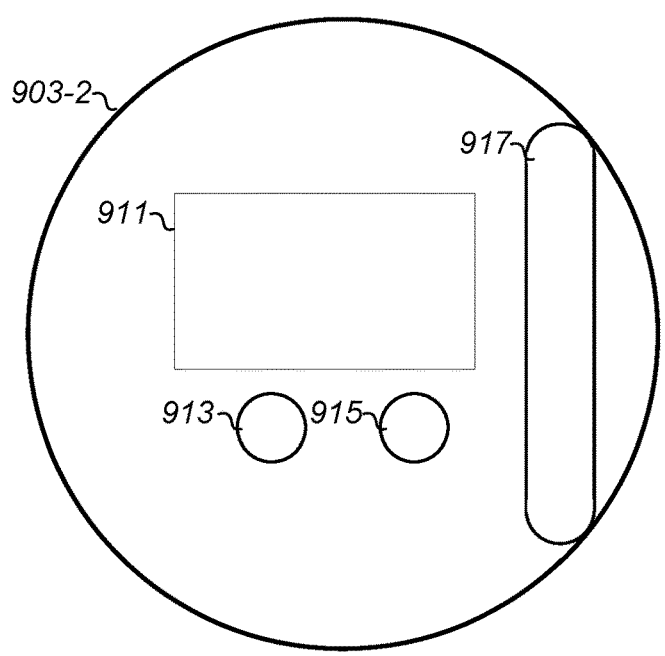

FIGS. 9B-9D are component views illustrating a representative smart device 901, in accordance with some implementations. In some implementations, the smart device 901 comprises the smart device 204. FIG. 9B shows the smart device 901 including a casing 903 and a backend 905. In accordance with some implementations, the backend 905 includes a radar transceiver 907 (e.g., communications module 942) and one or more controllers 909 (e.g., CPU(s) 902). In some implementations, the radar transceiver 907 is configured to detect one or more objects in the vicinity of the smart device 901. In some implementations, the one or more controllers 909 are configured to, for each detected object in the one or more detected objects, determine whether the detected object is in contact with the casing based on data received from the radar transceiver. In some implementations, the one or more controllers 909 are configured to identify an input command based on at least one of: a location of the detected object, and a movement of the detected object in accordance with a determination that the detected object is in contact with the casing 903. In some implementations, the one or more controllers 909 are configured to adjust operation of the smart device 901 based on the input command.

Figure 12A:
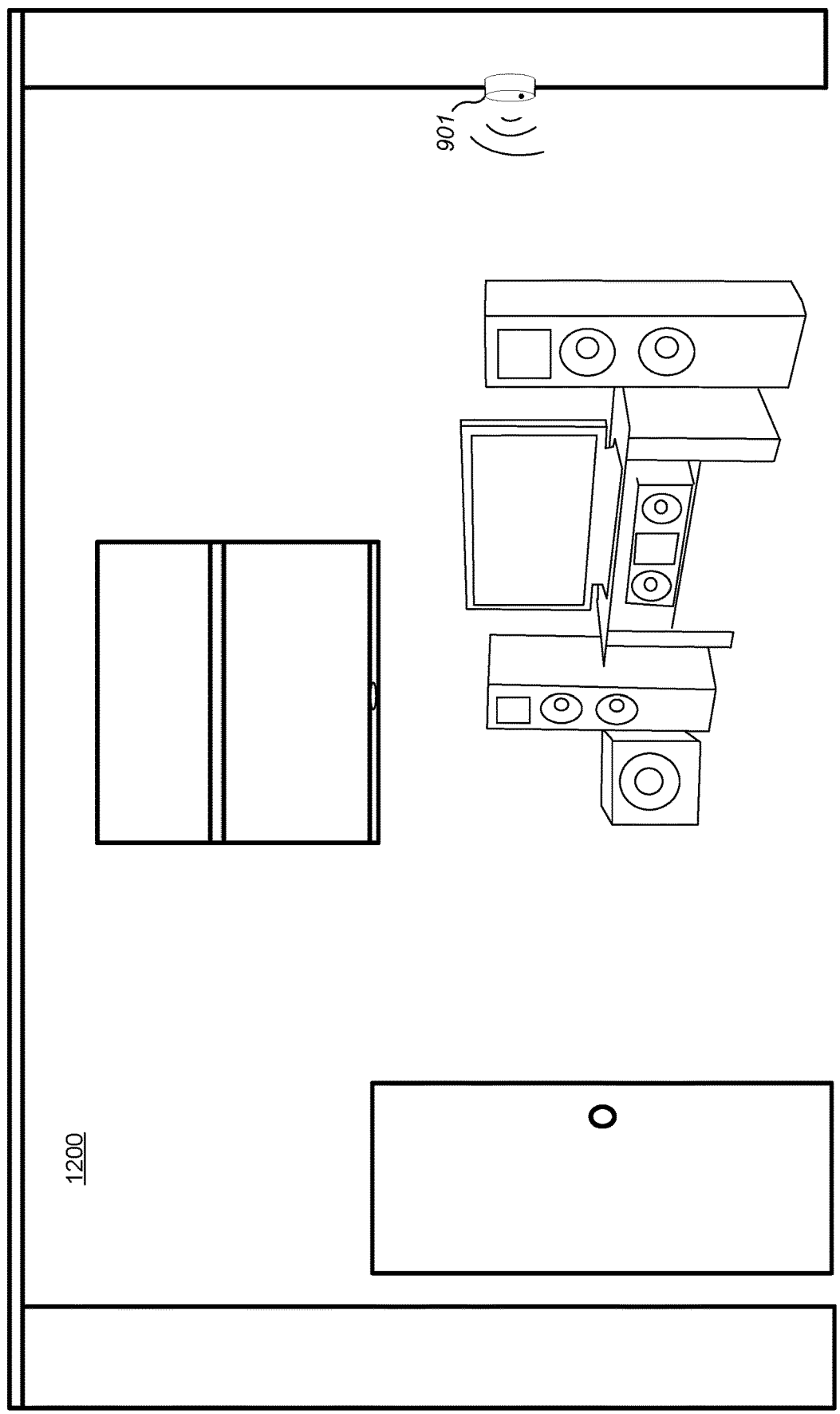
FIGS. 12A-12G illustrate example interactions with a representative smart device, in accordance with some implementations.

In some implementations, the smart device 901 is located within a particular room (e.g., as shown in FIG. 12A), and the one or more controllers 909 are configured to determine whether the particular room is occupied based on at least one of: the location of a detected object, and the movement of the detected object.

In some implementations, the radar transceiver 907 is configured to selectively operate in a first mode or a second mode. In some implementations, the first mode utilizes a first gain for detecting motion within the particular room; and the second mode utilizes a second gain to identify input commands received via objects in contact with the casing 903.

In some implementations, the one or more controllers 909 are configured to instruct the radar transceiver 907 to operate in the second mode in accordance with a determination that a detected object meets one or more predefined criteria. In some implementations, the one or more controllers 909 are configured to instruct the radar transceiver 907 to operate in the first mode in accordance with a determination that no detected objects meet the one or more predefined criteria.

In some implementations, the radar transceiver 907 is configured to transmit one or more radio signals. In some implementations, the radar transceiver 907 is configured to receive one or more radio signals corresponding to the one or more transmitted radio signals. In some implementations, the one or more controllers 909 are configured to determine whether the detected object is within a particular proximity radius to the smart device 901 by analyzing the one or more received radio signals. In some implementations, the one or more controllers 909 are configured to identify the detected object as being in proximity with the smart device 901 in accordance with a determination that the detected object is within the particular proximity radius. In some implementations, determining whether the object is in contact with the casing 903 includes determining whether the object is in contact with the casing 903 based on detected movement of the object.

FIG. 9C shows a representative casing 903-1 including a display 911. In some implementations, the display 911 is a touch-screen display. Although FIG. 9C shows the display 911 having a rectangular shape, the display 911 optionally has another geometric or irregular shape. In some implementations, the casing 903 includes a transparent or semi-transparent section and a display (e.g., a display mounted on the backend 905) is visible through the section.

FIG. 9D shows a representative casing 903-2 including the display 911, buttons 913 and 915, and slider 917. In some implementations, button 913, button 915 and slider 917 are virtual user interface elements. As used herein, a "virtual user interface element" is a section of a surface (e.g., a section of the casing 903-2 and/or a section of the display 911) denoted as performing a particular function, or set of functions. For example, in accordance with some implementations, the button 913 represents a section of the casing 903-2 that initiates a display on/off function when a user interacts with it. For example, when a user makes contact with the section of the casing 903-2 denoted as button 913, the display 911 toggles on or off. In some implementations, the smart device 901 is configured to initiate particular functions in accordance with determinations that a user has contacted the sections of the casing 903-2 corresponding to the button 913, button 915, and/or the slider 917. In some implementations, the smart device 901 is configured to initiate particular functions in accordance with determinations that a user has contacted, or nearly contacted (e.g., within 1 cm, 5 mm, or 1 mm of the casing surface), the sections of the casing 903-2 corresponding to the button 913, button 915, and/or the slider 917. In some implementations, the button 913, the button 915, and/or the slider 917 has a shape configured to stabilize a contacting object, such as a finger. For example, in accordance with some implementations, the buttons and/or slider are grooved, indented, and/or have a concave shape to provide stability to a human finger in contact with the buttons. In some implementations, the slider 917 is configured to perform a particular function, or set of functions, in response to a user gesture (e.g., a vertical swipe gesture). For example, the slider 917 is configured to adjust a temperature setting or volume setting in response to a contact making a vertical swipe gesture along at least a portion of the slider 917.

Radar-Equipped Smart Devices

Figure 10A:
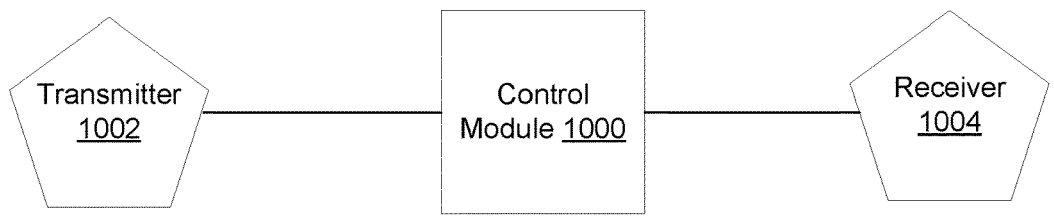
FIGS. 10A-10C are block diagrams illustrating representative radar systems, in accordance with some implementations.
Figure 10B:
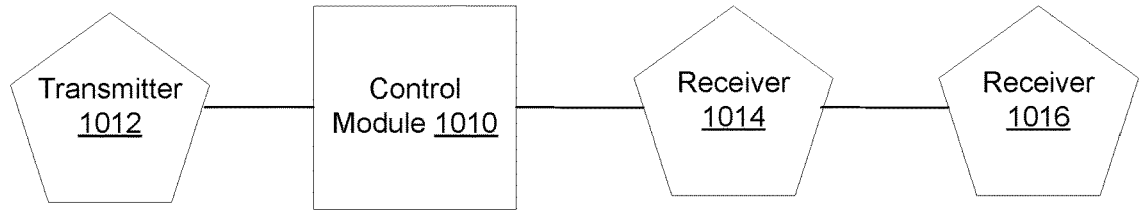
Figure 10C:
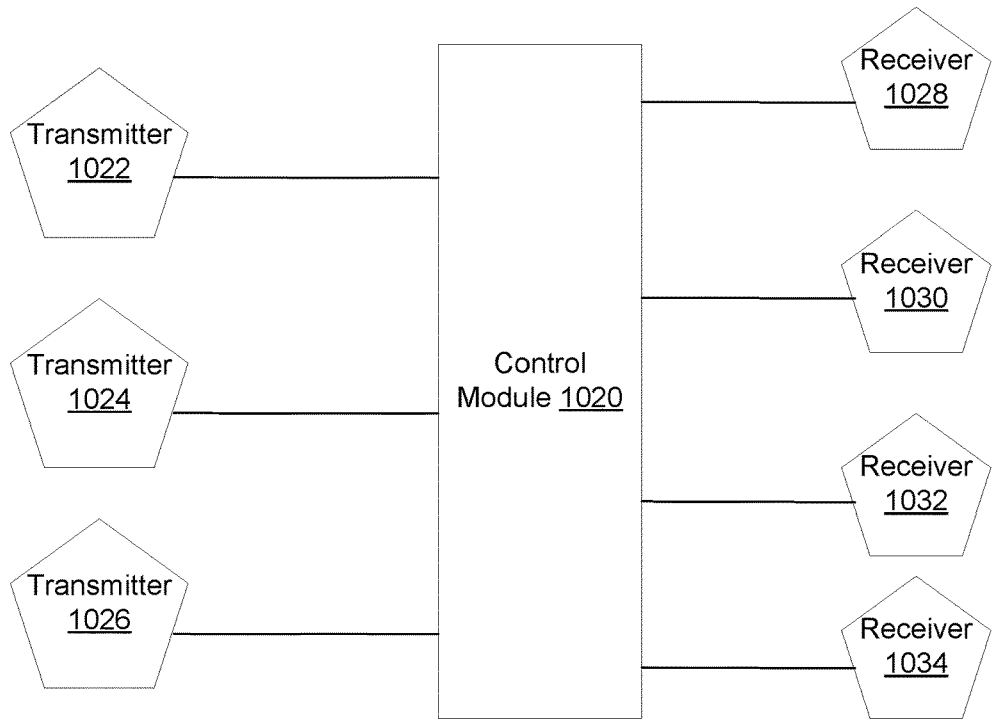

FIGS. 10A-10C illustrate block diagrams of radar systems, in accordance with some implementations. In some implementations, the radar systems illustrated in FIGS. 10A-10C are components of a smart device 204. For example, in accordance with some implementations, components of the smart device 204 illustrated in FIG. 9A, such as communications module 942, radar module 944, and/or radar processing module 9324 comprise one of the radar systems illustrated in FIGS. 10A-10C.

FIG. 10A illustrates a block diagram of a one-dimensional radar system, in accordance with some implementations. The one-dimensional radar system in FIG. 10A includes radar control module 1000, a radio transmitter 1002, and a radio receiver 1004. In some implementations, the one-dimensional radar system is configured such that the transmitter 1002 and the receiver 1004 are a known distance apart on a single plane. In some implementations, the transmitter 1002 includes an antenna, such as a stamped sheet metal antenna, an adhesive antenna (e.g., a sticker or tape antenna), a trace antenna on the surface of a printed circuit board (also sometimes called a PCB antenna or a board antenna), a chip antenna, or a ceramic antenna. In some implementations, the receiver 1004 includes an antenna, such as a stamped sheet metal antenna, an adhesive antenna, a trace antenna, a chip antenna, or a ceramic antenna.

FIGS. 10B and 10C illustrate block diagrams of multi-dimensional radar systems. FIG. 10B shows a multi-dimensional radar system with radar control module 1010, a radio transmitter 1012, and radio receivers 1014 and 1016. In some implementations, the radio transmitter 1012 and the radio receivers 1014 and 1016 each include an antenna configured for one or more radio frequency bands. For example, the transmitter 1012 emits a radio signal, such as a tone or pulse (e.g., a 77 GHz tone). The receivers 1014 and 1016 receive radio waves corresponding to the emitted radio signal. The control module 1010 compares the timing and phase of the received radio waves with the emitted radio signal to determine the location and/or motion of various detected objects. Differences between the radio waves received at receiver 1014 and the radio waves received at receiver 1016 are analyzed to determine the location/motion of the detected objects with greater accuracy and/or precision.

FIG. 10C shows a multi-dimensional radar system with radar control module 1020, radio transmitters 1022, 1024, and 1026, and radio receivers 1028, 1030, 1032, and 1034. In some implementations, the radio transmitters 1022, 1024, and 1026 and the radio receivers 1028, 1030, 1032, and 1034 are all on a same plane perpendicular to a dimension of interest. In some implementations, the radio transmitters 1022, 1024, and 1026 and the radio receivers 1028, 1030, 1032, and 1034 each include an antenna configured for one or more radio frequency bands. For example, first the transmitter 1022 emits a radio signal. The receivers 1028, 1030, 1032, and 1034 receive radio waves corresponding to the emitted radio signal. The control module 1020 compares the timing and phase of the received radio waves with the emitted radio signal to determine the location and/or motion of various detected objects. Differences between the radio waves received at respective receivers are analyzed to determine the location/motion of the detected objects with greater accuracy and/or precision. Next the transmitter 1024 emits a radio signal and the process is repeated. Then transmitter 1026 emits a radio signal and the process is repeated again. Utilizing multiple transmitters and multiple receivers at known distances from one another allows for more accurate and precise results. Utilizing multiple receivers also enables tracking of multiple objects moving simultaneously. For example, accurate tracking of N objects generally requires at least N+1 receivers.

In some implementations, the radar systems described herein utilize continuous-wave radar. In some implementations, the radar systems utilize un-modulated continuous wave radar to detect moving objects based on Doppler effects. In some implementations, the radar systems utilize frequency-modulated continuous wave radar (FMCW), such as sawtooth or sinusoidal frequency modulation, to determine object distances and motion. For example, in accordance with some implementations, the frequency is modulated across a frequency band, such as 3-10 GHz, 24-24.5 GHz, 57-64 GHz, and/or 77-81 GHz. In some implementations, the radar system utilizes FMCW and determines the velocity of various objects based on a phase shift, or a rate of phase shift, in radar signals reflected off the objects. In some implementations, the radar system utilizes a phase shifting modulation continuous wave radar (PMCW). In some implementations, the radar system utilizes PMCW to detect object locations and motion by generating pseudo-random phase-shifting sequences.

In some implementations, the radar systems described herein employ relatively low power radar transmitters due to the radar transmitters being deployed within or in proximity to a smart home environment (e.g., a smart home environment 100 as shown in FIG. 1), where long range radar detection is not required. For example, in accordance with some implementations, the radar transmitters consume less than one watt of power while in an idle or periodic scan mode. In some implementations, the radar transmitters comprise low power radar transmitters configured to consume less than a threshold amount of power (e.g., less than 1 W, 100 mW, or 10 mW). In some implementations, operation of the radar transmitters is constrained to a limited range— even compared to the natural range of the radar transmitters—based on a characteristic size (e.g., area, volume, width, depth, height, etc.) of the smart home environment 100 as a whole or of rooms within the smart home environment 100. In some implementations, the radar transmitter range is constrained through use of radar tags as described herein. In some implementations, the radar transmitter range is constrained by radar signal processing operations performed by the server system 508 or the electronic tag 206 that have the effect of rejecting signal returns from objects whose distance from the transmitter is greater than a predefined distance. In some implementations, operation of the radar transmitters is constrained to identify objects that are stationary or that are moving slowly as such transmitters are commonly used in a smart home environment to identify relatively slowly moving people (adults and children) and pets. In some implementations, the radar systems described herein are employed to detect anomalies of objects, people and/or animals within a smart home environment 100. For example, anomalies detectable by the radar system in some implementations include anomalous behavior of people within the smart home environment, such as an individual who has fallen down, is breathing erratically, is in the home following activation of a smoke alarm, an individual that is not recognized (e.g., an intruder), or a child present in restricted areas of a home, such as near entrances to a garage or a pool.

Various types of internal antennas are optionally used with the various devices disclosed herein. Internal antennas are sometimes called embedded antennas. As used herein, an internal antenna includes any antenna that lies within the device casing. Internal antennas are generally not implemented within metal casings as the metal casing will degrade efficiency. The internal antennas are coupled to a communications control module (e.g., control module 1000, 1010, or 1020). The communications control module is sometimes called communications circuitry, a radio module, or a radio. In some implementations, the communications control module comprises a communications chip. In some implementations, an internal antenna is coupled to a communications control module via one or more controlled impedance structures, such as coaxial cable, controlled impedance circuit board traces (e.g., microstrip or stripline), spring-loaded pogo pins or spring fingers, flex circuits with controlled impedance lines, and the like. In some implementations, the internal antenna is coupled to the communications control module via one or more filters, amplifiers, and/or switches. Cables and traces will introduce losses and should be carefully considered. For example, cables and traces create opportunities for noise to enter the receiver system.

Internal antennas are generally susceptible to interference with other device components (including other internal antennas). In some instances, the primary noise source is digital circuitry, such as the processor(s) and memory. For example, in some instances, processor clocks, high-speed memory, displays, and graphics processors are the highest sources of noise and produce the widest range of frequencies. In some implementations, the digital electronics are shielded with board-mounted shield cans. In some implementations, the antenna(s) are positioned as far from the largest noise sources as possible. In some implementations, the antenna interconnect(s) are routed away from the largest noise sources. In some implementations, non-shielded antenna interconnects (e.g., spring fingers or pogo pins) are positioned to limit exposure to the largest noise sources.

A sheet metal antenna is also sometimes called a stamped metal antenna. In some implementations, a sheet metal antenna is mounted on circuit board and coupled to a communications module. In some implementations, sheet metal antenna is mounted perpendicular to the plane of circuit board. In some implementations, the sheet metal antenna is mounted parallel to the plane of circuit board. In some implementations, the sheet metal antenna comprises an inverted-F style antenna. In some implementations, the sheet metal antenna comprises a patch antenna. In some implementations, the patch antenna is a printed patch antenna. In some implementations, the patch antenna is printed on a surface of a multi-layer circuit board. In some implementations, the patch antenna comprises a directional antenna with a primary lobe of radiation oriented away from the ground plane of the device.

The size and shape of the local ground plane and the relatively close spacing of the ground plane to the antenna element each have an impact on the antenna design. Sheet metal antennas are optimally placed on the edge of a ground plane, such as the edge of a circuit board, or on top of a planar ground plane surface. Thus, a sheet metal antenna is optimally not surrounded by ground planes and/or other conducting surfaces.

A board antenna is sometimes also called a printed circuit board (PCB) antenna or a PCB trace antenna. In some implementations, a board antenna is mounted on circuit board and is coupled to communications module. Board antennas are generally affected by the circuit board's substrate properties, such as the dielectric constant and dissipation factor. In some implementations, the board antenna comprises a single-ended antenna. In some implementations, the board antenna comprises a differential antenna. In some implementations, the board antenna comprises a Yagi antenna. In some implementations, the board antenna comprises an F antenna. In some implementations, the board antenna comprises an inverted-F antenna. In some implementations, the board antenna is laminated on the circuit board surface. In some implementations, the board antenna occupies one or more layers on the circuit board.

A chip antenna is generally mounted on a printed circuit board. In some implementations, chip antennas are placed on a circuit board like a standard circuit component, although these antennas generally suffer in efficiency. Chip antennas are generally affected by the circuit board's substrate properties, such as the dielectric constant and dissipation factor. The circuit board's substrate material reduces the resonant length of the antenna, which results in a reduction of the usable bandwidth. The circuit board substrate also introduces a loss mechanism and reduces the antenna's efficiency. In some instances where the available board space for the antenna is limited, a chip antenna is an optimal antenna type. In some implementations, the chip antenna comprises a ceramic chip antenna. In some implementations, the chip antenna comprises an F antenna. In some implementations, the chip antenna comprises an inverted-F antenna. In some implementations, the chip antenna comprises a monopole antenna.

In some implementations, an adhesive antenna is mounted to a cover (also sometimes called a casing or a housing). In some implementations, the adhesive antenna comprises a tape antenna. In some implementations, the adhesive antenna comprises a sticker antenna. In some implementations, the adhesive antenna comprises a conductive paint antenna. In some implementations, the adhesive antenna comprises a wire antenna.

To optimize performance and reduce noise, a radar system (e.g., radar antennas and circuitry) is generally positioned such that the radar system is unobstructed by other components. For example, in a device with multiple circuit boards, the radar system is generally positioned on the circuit board nearest to the cover in the direction the radar system is intended to monitor. Metal casings and other similar materials that create electro-magnetic fields are generally not positioned in front of the radar system as they may introduce noise and/or decrease the detection range. In some implementations, the radar system is positioned within a smart device so as to minimize impedance mismatches for the transmitted radio waves leaving/entering the device. In some implementations, the radar system is positioned within a smart device so as to minimize interference with other communication systems by positioning antennas remote from one another (e.g., by placing the antennas on opposite ends of a circuit board). In some implementations, the radar system is positioned parallel to the device cover facing a particular area of interest (or dimension of interest) so as to optimize resolution in the area of interest (or dimension of interest).

In a device with both Wi-Fi and radar systems, such as a radar-equipped smart device 204, interference between the Wi-Fi and radar signals is optionally minimized by configuring the device such that the radar frequency is not a harmonic of the Wi-Fi frequency or vice versa.

In a device with both a radar system and a temperature sensor, such as a radar-equipped thermostat 102, interference between the temperature sensor and the radar system is optionally minimized by configuring the device such that the temperature sensor is not operating at the same time as the radar, or immediately following the radar operation. In some instances, operation of the radar system generates sufficient heat to make temperature sensor readings of the smart home environment inaccurate. In some implementations, a duty cycle for the radar system is configured such that the radar does not transmit radio waves immediately prior to the temperature sensor performing a temperature reading.

Figure 10D:
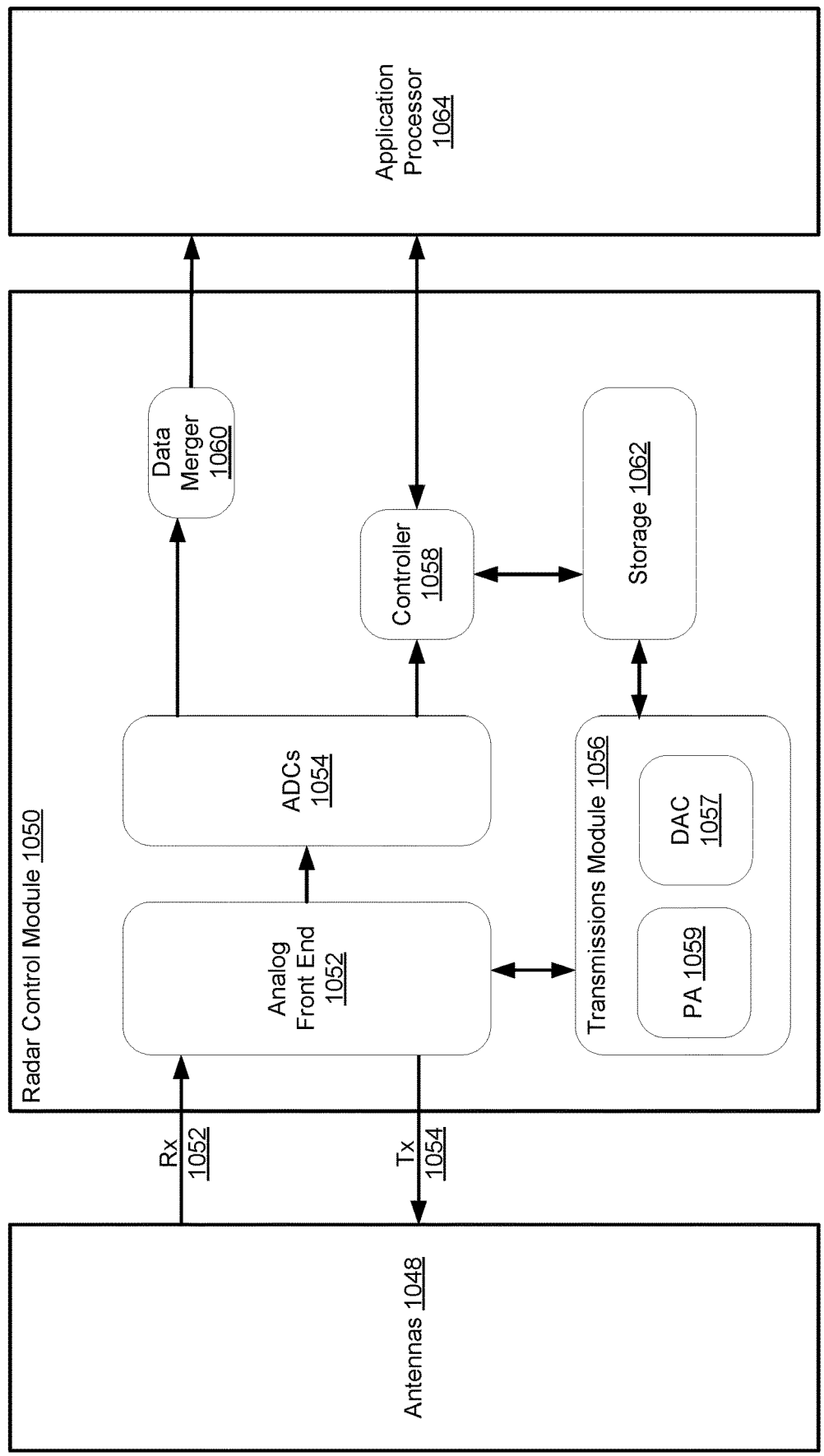
FIG. 10D is a block diagram illustrating a representative radar control module, in accordance with some implementations.

FIG. 10D is a block diagram illustrating a radar control module 1050, in accordance with some implementations. The radar control module 1050 is coupled to a plurality of antennas 1048 for transmitting and receiving radio waves via receiver lines 1052 and transmission lines 1054. In some implementations, the radar control module 1050 includes an analog front end 1052 coupled to the antennas 1048.

In some implementations, the analog front end 1052 is coupled to a plurality of analog-to-digital converters (ADCs) 1054 for converting the analog signals received from the antennas to digital signals. In some implementations the plurality of ADCs 1054 includes a first plurality of ADCs for calculating an imaginary component of the received signals and a second plurality of ADCs for calculating a real component of the received signals.

In some implementations, the analog front end 1052 is coupled to a transmissions module 1056. In some implementations, the transmissions module 1056 is configured to generate various radio signals for transmission by the antennas 1048. In some implementations, the transmissions module 1056 is configured to sample received signals from the analog front end for use in generating radio signals for future transmission. In some implementations, the transmissions module 1056 includes a digital-to-analog converter (DAC) 1057 and a power amplifier 1059. In some implementations, the transmissions module 1056 includes a signal mixer and/or oscillator. In some implementations, the transmissions module 1056 is configured to build a programmable radar signal for transmission by the antennas 1048.

In some implementations, the ADCs 1054 are coupled to a controller 1058 for processing of the digital signals. In some implementations, the controller 1058 performs for digital signal processing (DSP), such as a fast Fourier transform (FFT), on the digital signals. In some implementations, the controller 1058 includes a multi-core processor, such as an ARM® processor produced by ARM Limited.

In some implementations, the radar control module 1050 includes a storage 1062. In some implementations, the storage is for storing data from the controller 1058 and/or the transmissions module 1056. In some implementations, the storage is used to store data received from an application processor 1064. In some implementations, the storage includes a plurality of registers. In some implementations, the storage includes volatile and/or non-volatile memory.

In some implementations, the radar control module 1050 includes a data merger 1060 coupled to the ADCs 1054. In some implementations, the data merger 1060 is configured to aggregate the data output by the individual ADCs for further processing.

In some implementations, the radar control module 1050 includes a power submodule (not shown) for providing power to the various components of the radar control module 1050.

In some implementations, the radar control module 1050 is coupled to an application processor 1064 and outputs data from the data merger 1060 and/or the controller 1058 for further processing by the application processor 1064. In some implementations, control module 1000, control module 1010, and/or control module 1020 comprises radar control module 1050.

Figure 10E:
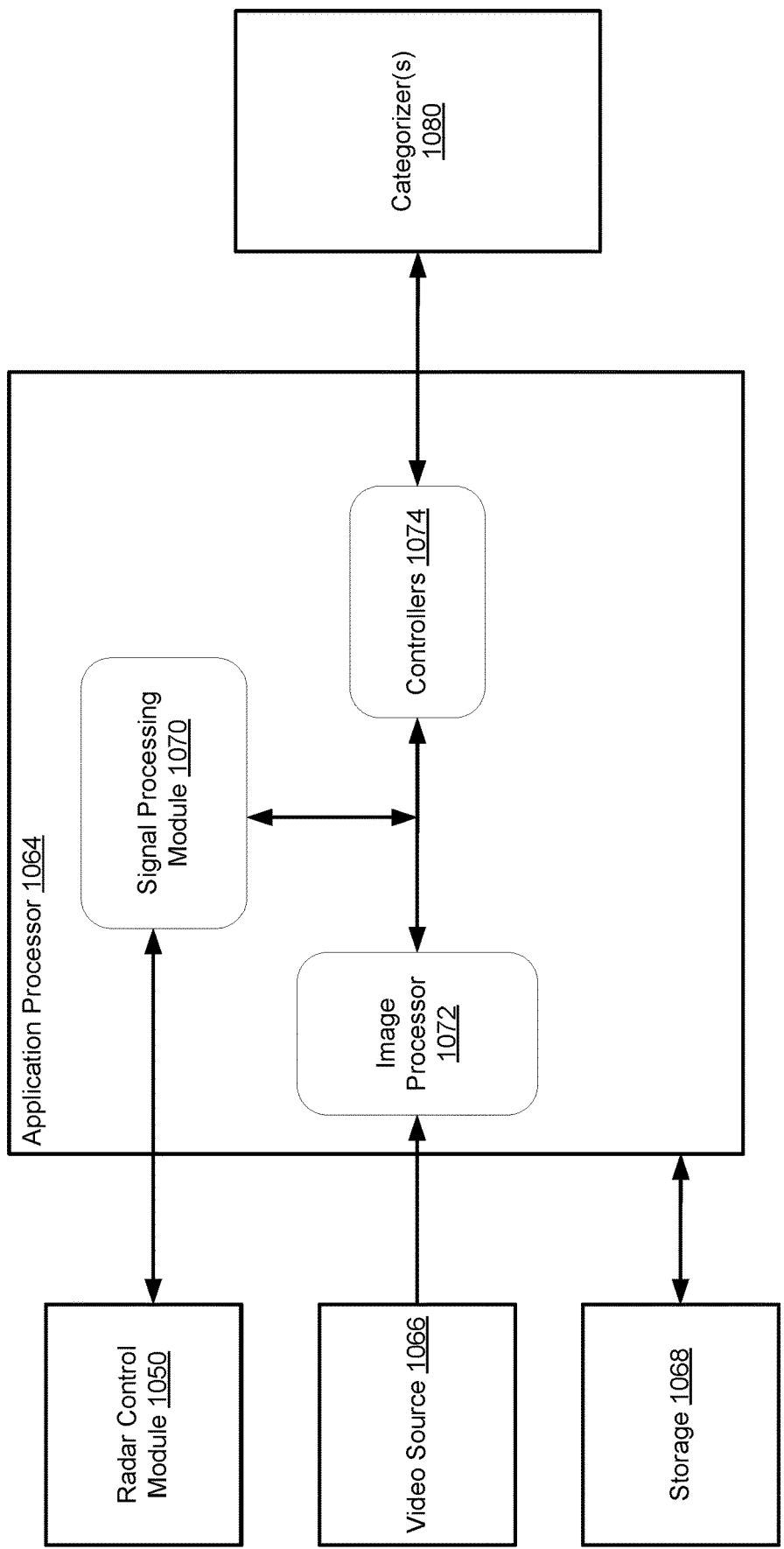
FIG. 10E is a block diagram illustrating a representative application processor, in accordance with some implementations.

FIG. 10E is a block diagram illustrating an application processor 1064, in accordance with some implementations. FIG. 10E shows application processor 1064 coupled to the radar control module 1050, a video source 1066, a storage 1068, and categorizer(s) 1080. In some implementations, the application processor 1064 is a component of a radar-equipped device, such as a smart device 204. In some implementations, the application processor 1064 is a component of a server system, such as server system 508. In some implementations, the application processor 1064 comprises event processor 7146 and radar processor 7145.

In some implementations, the application processor 1064 includes an image signal processor (ISP) 1072 for processing images received from the video source 1066. In some implementations, processing the images includes determining pixel colors, adjusting exposure, adjusting focus, correcting for lens imperfections, reducing noise, and the like.

In some implementations, the application processor 1064 includes a signal processing module 1070 for processing data received from the radar control module 1050 and/or the image processor 1072. In some implementations, the signal processing module 1070 performs transformations of the data, such as fast Fourier transforms, to facilitate aggregating and analyzing the data.

In some implementations, the application processor 1064 includes a plurality of controllers 1074 for analyzing the radar data and/or the image data. In some implementations, the controllers 1074 identify objects of interest in the radar data and/or the image data. In some implementations, the controllers 1074 perform machine learning by analyzing the identified objects, categories assigned to the identified objects, and/or clusters of the identified objects.

In some implementations, the categorizer(s) 1080 categorize objects of interest identified by the controllers 1074. In some implementations, the categorizer(s) 1080 categorizer radar and/or motion events involving one or more objects of interest identified by the controllers 1074.

In some implementations, the application processor 1064 is coupled to a storage 1068. In some implementations, the storage 1064 includes volatile memory and/or non-volatile memory. In some implementations, the storage 1064 comprises DDR memory. In some implementations, the storage 1064 stores data output by the ISP 1072, the controllers 1074, and/or the categorizer(s) 1080. For example, the storage 1064 stores objects of interest identified by the controllers 1074.

Figure 11A:
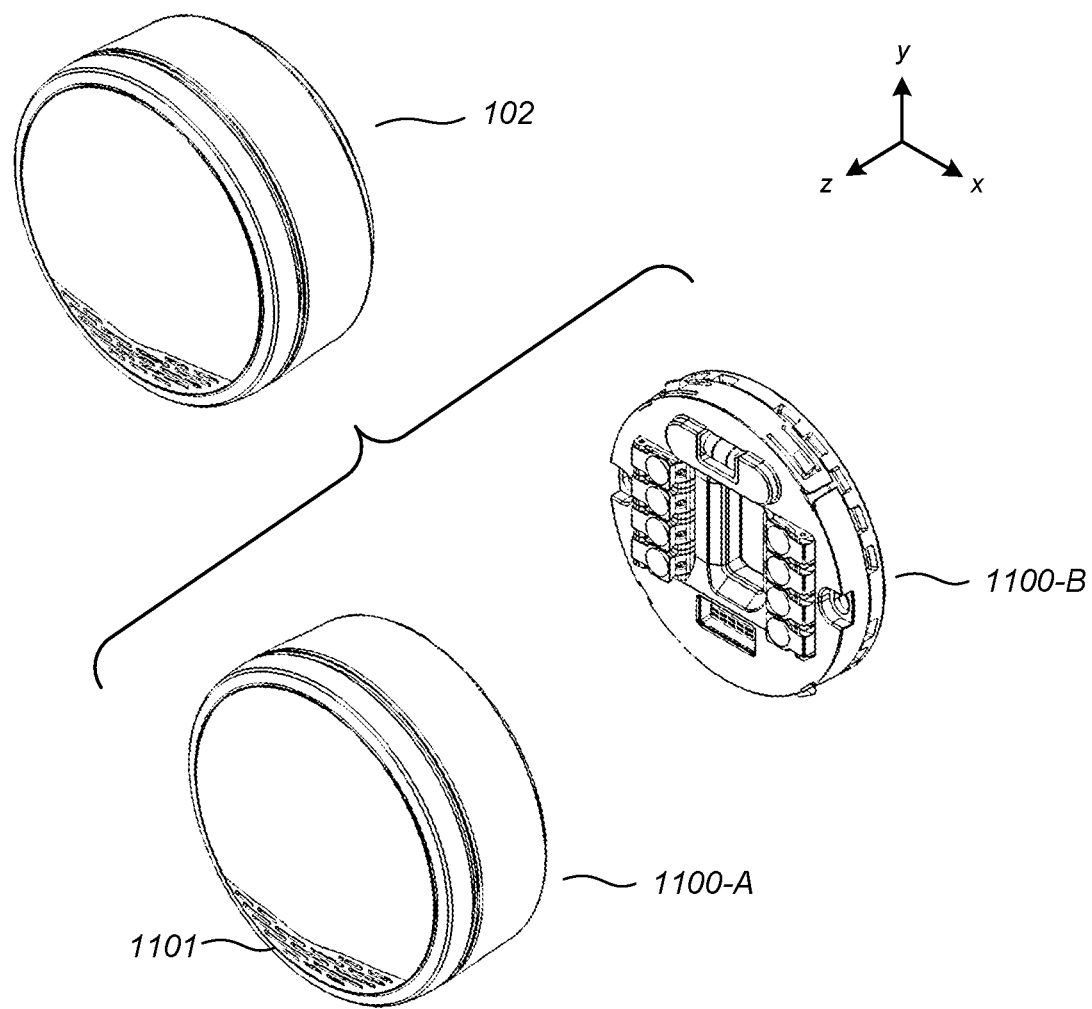
FIGS. 11A-11C are component views illustrating a representative thermostat, in accordance with some implementations.
Figure 11B:
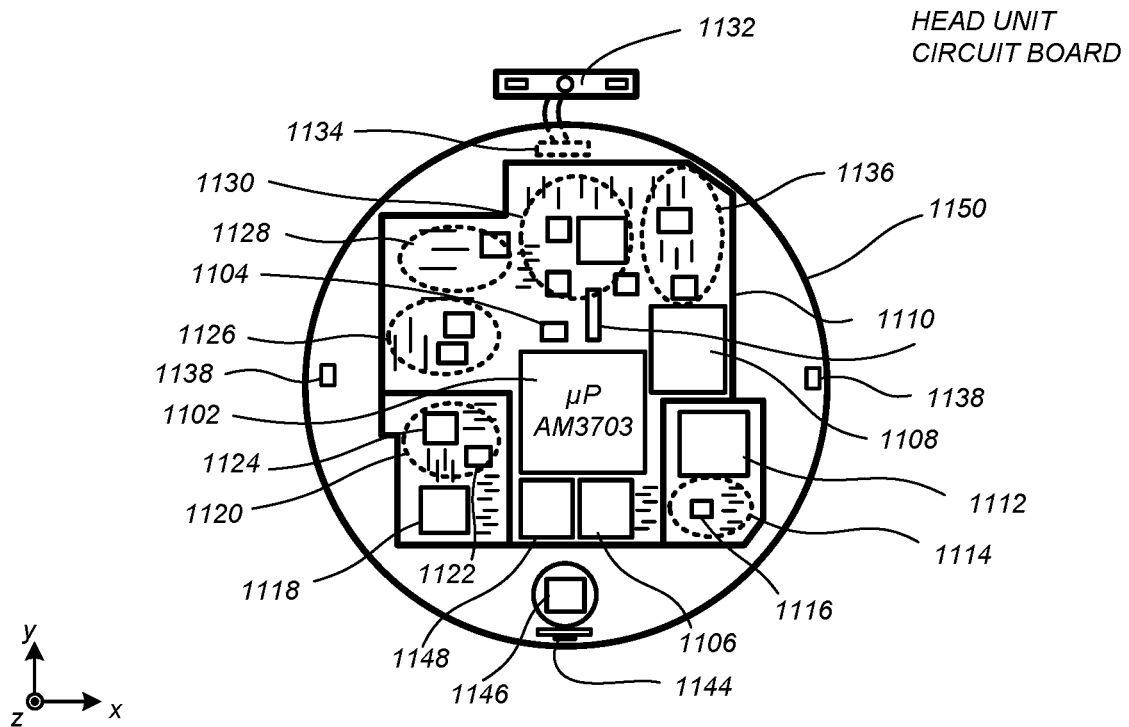
Figure 11C:
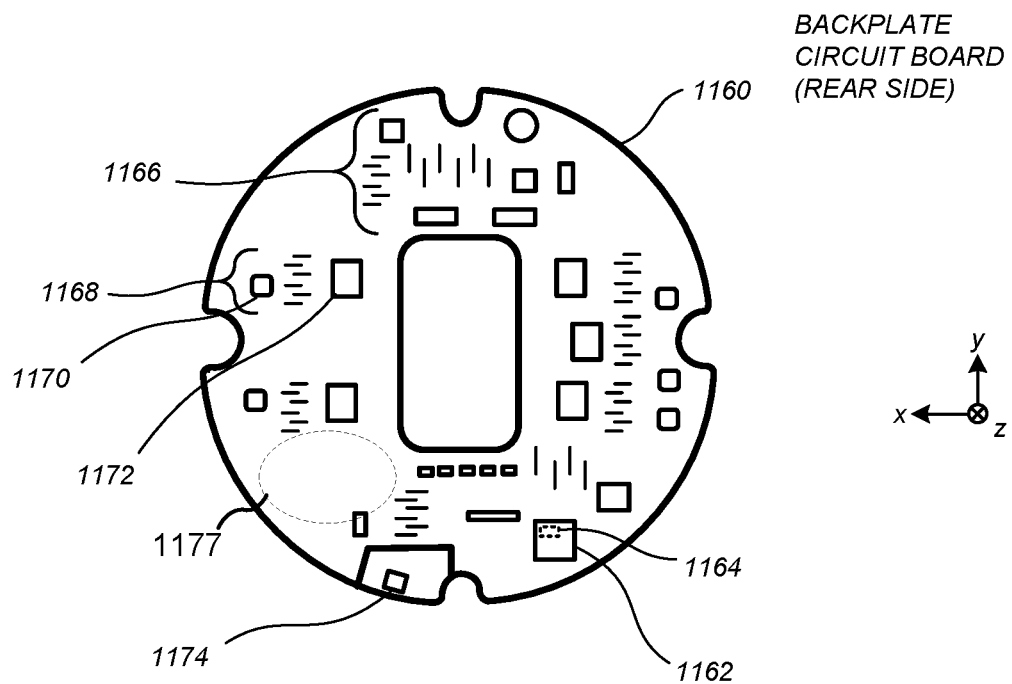

FIGS. 11A-11C illustrate various views of a smart thermostat (e.g., smart thermostat 102, FIG. 1) that is optionally used as part of a smart home environment 100, as previously described.

Specifically, FIG. 11A illustrates an exploded perspective view of the smart thermostat 102 with respect to two components, the head unit 1100-A, and the back plate 1100-B. The head unit 1100-A includes a head unit circuit board 1150 (described in further detail with respect to FIG. 11B), and the back plate 1100-B includes a backplate circuit board 1160 (described in further detail with respect to FIG. 11C). Further technical and/or functional descriptions of various ones of the electrical and mechanical components illustrated herein below can be found in one or more of the commonly assigned incorporated applications, such as U.S. Ser. No. 13/199,108. In the drawings shown, the "z" direction is outward from the wall, the "y" direction is the head-to-toe direction relative to a walk-up user, and the "x" direction is the user's left-to-right direction.

FIG. 11B illustrates a head-on view of the head unit circuit board 1150 for the smart thermostat, which comprises a head unit microprocessor 1102 (such as a Texas Instruments AM3703 chip) and an associated oscillator 1104, along with memory 1106 (e.g., DDR SDRAM), and storage 1108 (e.g., mass NAND storage). For wireless communications capability (e.g., Wi-Fi), there is provided (e.g., in a separate compartment of radio frequency (RF) shielding 1110) a wireless communications module 1112, such as a Murata Wireless Solutions LBWA19XSLZ module, which is based on the Texas Instruments WL1270 chipset supporting the 802.11 b/g/n WLAN standard. For the wireless communications module 1112 is supporting circuitry 1114 including an oscillator 1116. In accordance with some implementations, for ZigBee capability, there is provided (e.g., in a separately shielded RF compartment) a ZigBee module 1118, such as a C2530F256 module from Texas Instruments. For the ZigBee module 1118 there is provided supporting circuitry 1120 including an oscillator 1122 and a low-noise amplifier 1124. In accordance with some implementations, the smart thermostat also includes display backlight voltage conversion circuitry 1126, piezoelectric driving circuitry 1128, and/or power management circuitry 1130 (local power rails, etc.). In some implementations, provided on a circuit board 1132 (e.g., a flex circuit board) that attaches to the back of the head unit circuit board by a flex circuit connector 1134 is a proximity and ambient light sensor (PROX/ALS) such as a Silicon Labs SI1142 Proximity/Ambient Light Sensor with an I2C Interface. In some implementations, the smart thermostat includes one or more of: battery charging-supervision-disconnect circuitry 1136, and spring/RF antennas 1138. In some implementations, the smart thermostat also includes one or more of: a temperature sensor 1144 (rising perpendicular to the circuit board in the +z direction containing two separate temperature sensing elements at different distances from the circuit board), and a PIR motion sensor 1146. In some implementations, PIR motion sensor 1146 (and associated circuitry) is replaced by a radar system, such as one of the radar systems of FIGS. 10A-10C. In some implementations, smart thermostat includes a radar system in addition to PIR motion sensor 1146. In some implementations, the radar system is located at least in part on the head unit circuit board 1150. For example, in accordance with some implementations, the radar system is located in a bottom region of the top-side of the head unit circuit board 1150 (e.g., next to, or replacing, the PIR motion sensor 1146). In some implementations, the radar system is located at least in part on a flex circuit board coupled to the head unit circuit board 1150 (e.g., in addition to, or replacing, the PROX/ALS circuit). In some implementations, the radar system comprises a 1-D radar and the radar is located off-center on the circuit board 1150 such that the radar can differentiate between objects moving on distinct sides of the smart thermostat.

In some implementations, even though the PROX/ALS and temperature sensors 1144 and PIR motion sensor 1146 are physically located on the head unit circuit board 1150, all these sensors are polled and controlled by the low-power backplate microcontroller on the backplate circuit board, to which they are electrically connected. In some implementations, the head unit circuit board includes a Bluetooth module 1148, and additional circuitry (not shown) which includes one or more oscillators, amplifiers, and/or any other support circuitry. In some implementations, the head unit circuit board includes one or more integrated circuits which include a combination of radios and transceivers. For example, in some implementations, the wireless communications module 1112 and the Bluetooth module 1148 comprise a single chip, wherein the wireless communications module 1112 and the Bluetooth module 1148 transmit and receive signals using a single antenna 1138. Various implementations of transceivers (e.g., radio(s) 940 and radio(s) 950) are described in greater detail with respect to FIG. 9A.

FIG. 11C illustrates a rear view of the backplate circuit board 1160, comprising a backplate processor/microcontroller 1162, such as a Texas Instruments MSP430F System-on-Chip Microcontroller that includes an on-board memory 1164. The backplate circuit board 1160 further comprises power supply circuitry 1166, which optionally includes power-stealing circuitry, and switch circuitry 1168 for switching between respective HVAC functions. In some implementations, for each HVAC function the switch circuitry 1168 includes an isolation transformer 1170 and a back-to-back NFET package 1172. The use of FETs in the switching circuitry allows for "active power stealing", i.e., taking power during the HVAC "ON" cycle, by briefly diverting power from the HVAC relay circuit to the reservoir capacitors for a very small interval, such as 100 microseconds. This time is small enough not to trip the HVAC relay into the "off" state but is sufficient to charge up the reservoir capacitors. The use of FETs allows for this fast switching time (100 micro-seconds), which would generally be difficult to achieve using relays (which stay on for tens of milliseconds). Also, such relays would generally readily degrade doing this kind of fast switching, and may also make audible noise. In contrast, in accordance with some implementations, the FETs operate with no, or essentially no, audible noise. In some implementations, the backplate circuit board 1160 also includes a combined temperature/humidity sensor module, such as a Sensirion SHT21 module. In some implementations, the backplate microcontroller 1162 performs one or more of: polling of the various sensors, sensing for mechanical wire insertion at installation, alerting the head unit regarding current vs. setpoint temperature conditions and actuating the switches accordingly, and other functions such as looking for appropriate signal on the inserted wire at installation.

In accordance with the teachings of the commonly assigned U.S. Ser. No. 13/269,501, the commonly assigned U.S. Ser. No. 13/275,307, and others of the commonly assigned incorporated applications, the smart thermostat 102 (FIG. 1) represents an advanced, multi-sensing, microprocessor-controlled intelligent or "learning" thermostat that provides a rich combination of processing capabilities, intuitive and visually pleasing user interfaces, network connectivity, and energy-saving capabilities (including the presently described auto-away/auto-arrival algorithms) while at the same time not requiring a so-called "C-wire" from the HVAC system or line power from a household wall plug. In some instances, such advanced functionalities can require a greater instantaneous power draw than a "power-stealing" option (i.e., extracting smaller amounts of electrical power from one or more HVAC call relays) can safely provide. By way of example, in some circumstances, the head unit microprocessor 1102 draws on the order of 250 mW when awake and processing, and an LCD module (not shown) draws on the order of 250 mW when active. Moreover, the Wi-Fi module 1112 draws 250 mW when active, and needs to be active on a consistent basis such as at a consistent 2% duty cycle in common scenarios. However, in order to avoid falsely tripping the HVAC relays for a large number of commercially used HVAC systems, power-stealing circuitry is often limited to power providing capacities on the order of 100 mW-200 mW, which would not be enough to supply the needed power for many common scenarios.

In some implementations, the smart thermostat 102 resolves such issues at least by virtue of the use of a rechargeable battery (or equivalently capable onboard power storage medium) that will recharge during time intervals in which the hardware power usage is less than what power stealing can safely provide, and that will discharge to provide the needed extra electrical power during time intervals in which the hardware power usage is greater than what power stealing can safely provide. In order to operate in a battery-conscious manner that promotes reduced power usage and extended service life of the rechargeable battery, the thermostat 1800 is provided with both (i) a relatively powerful and relatively power-intensive first processor (such as a Texas Instruments AM3703 microprocessor) that is capable of quickly performing more complex functions such as driving a visually pleasing user interface display and performing various mathematical learning computations, and (ii) a relatively less powerful and less power-intensive second processor (such as a Texas Instruments MSP430 microcontroller) for performing less intensive tasks, including driving and controlling the occupancy sensors. In some implementations, to conserve power, the first processor is maintained in a "sleep" state for extended periods of time and is "woken up" only for occasions in which its capabilities are needed, whereas the second processor is kept on more or less continuously (although preferably slowing down or disabling certain internal clocks for brief periodic intervals to conserve power) to perform its relatively low-power tasks. The first and second processors are mutually configured such that the second processor can "wake" the first processor on the occurrence of certain events, which can be termed "wake-on" facilities. In some implementations, these wake-on facilities can be turned on and turned off as part of different functional and/or power-saving goals to be achieved. For example, a "wake-on-PROX" facility can be provided by which the second processor, when detecting a user's hand approaching the thermostat dial by virtue of an active proximity sensor (PROX, such as provided by a Silicon Labs SI1142 Proximity/Ambient Light Sensor with I2C Interface), "wakes up" the first processor so that it can provide a visual display to the approaching user and be ready to respond more rapidly when their hand touches the dial. As another example, a "wake-on-PIR" facility can be provided by which the second processor will wake up the first processor when detecting motion somewhere in the general vicinity of the thermostat by virtue of a passive infrared (PIR) motion sensor, such as provided by a PerkinElmer DigiPyro PYD 1998 dual element pyrodetector. Notably, wake-on-PIR is not synonymous with auto-arrival, as there would need to be N consecutive buckets of sensed PIR activity to invoke auto-arrival, whereas only a single sufficient motion event can trigger a wake-on-PIR wake-up.

In some implementations, the smart thermostat 102 utilizes a radar system, such as one of the radar systems in FIGS. 10A-10C, to detect approaching users and/or hand touches, and wakes up the first processor based on the radar system detections.

In some implementations, the smart thermostat 102 includes a radar system, such as one of the radar systems of FIGS. 10A-10C, located on the top of the head unit 1100-A. For example, in some implementations, the radar system is located at least in part within region 1101 on the inside of the head unit cover. In some implementations, the radar system is located in an upper region of the cover of the head unit.

In some implementations, the smart thermostat 102 includes a radar system, such as one of the radar systems of FIGS. 10A-10C, located on the top of the head unit circuit board 1150. For example, in some implementations, the radar system is replaces the PIR sensor 1146 at the bottom of the head unit circuit board 1150. As another example, the radar system is located at least in part next to (e.g., to the left or right side of) the PIR sensor 1146.

In some implementations, the smart thermostat 102 includes a radar system located at least in part on a circuit board (e.g., a flex circuit board), such as flex circuit board 1132, connected to the head unit circuit board 1150 or the backplate circuit board 1160.

In some implementations, the radar system is positioned such that the control module (e.g., control module 1000) is located on a first component of the smart thermostat 102 and the antennas (e.g., transmitter 1002 and/or receiver 1004) are located on a second component of the smart thermostat 102. In some implementations, the radar system is positioned such that the control module (e.g., control module 1000) is located on a first circuit board (e.g., in region 1177 on the backplate circuit board 1160) and the antennas are located on a second circuit board (e.g., in place of PIR 1146 on the head unit circuit board 1150). In some implementations, one or more of the antennas are located on a flex circuit board (e.g., flex circuit board 1132), or are mounted to the cover (e.g., within region 1101) of the smart thermostat 102.

Figure 12B:
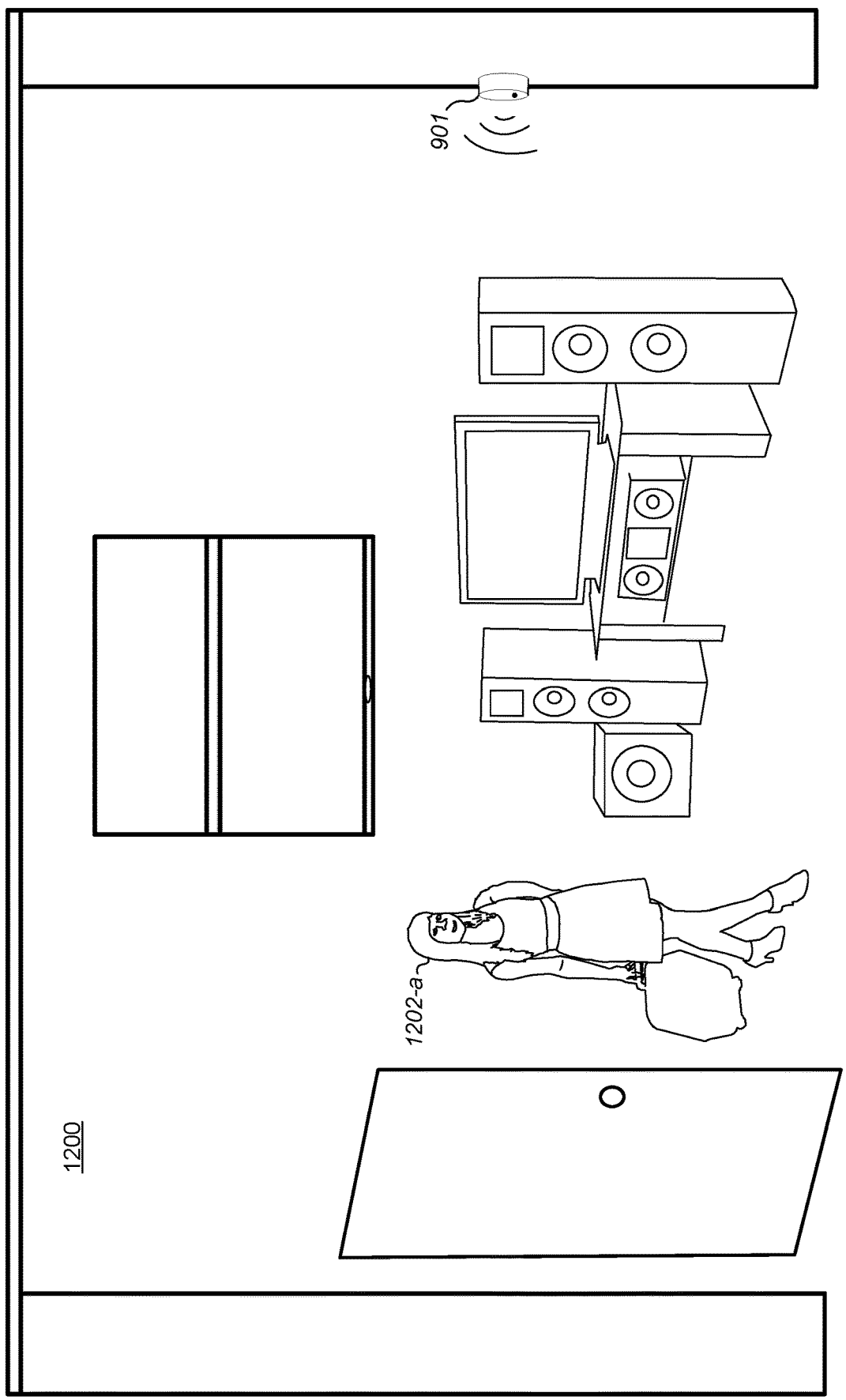

FIGS. 12A-12G illustrate example interactions with the smart device 901, in accordance with some implementations. FIG. 12A shows the smart device 901 affixed to a wall in room 1200. In some implementations, the smart device 901 determines whether or not the room 1200 is occupied. For example, the smart device 901 in FIG. 12A determines that room 1200 is unoccupied. FIG. 12B shows a person 1202 entering room 1200 at location 1202-a. In accordance with some implementations, the smart device 901 detects the person 1202 via radar and determines that the room 1200 is now occupied. In some implementations, in accordance with a determination that the room 1200 is occupied, the smart device 901 changes operating modes (e.g., adjusts the radar duty cycle, adjusts radar gain, and the like).

Figure 12C:
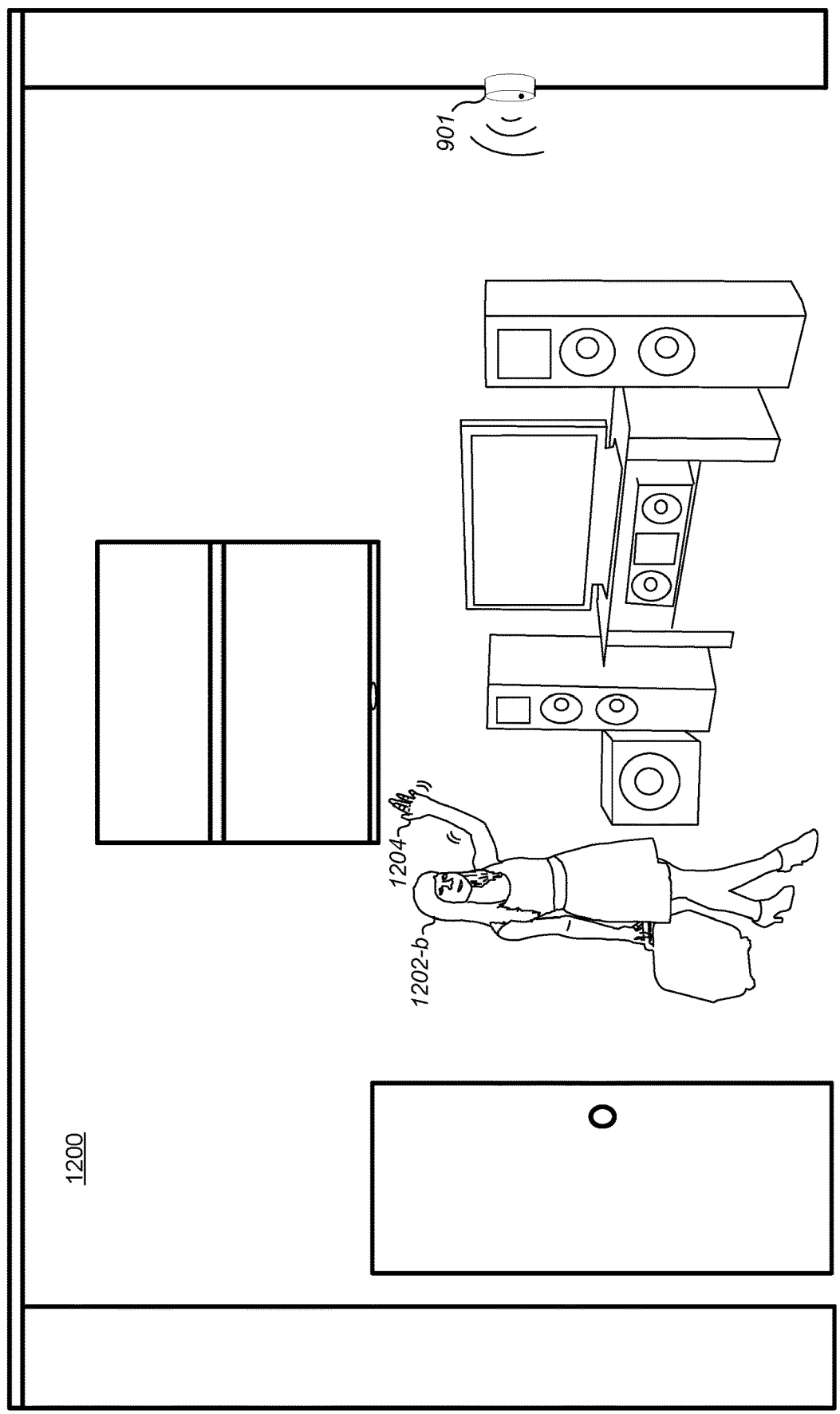

FIG. 12C shows the person 1202 at location 1202-b performing a gesture 1204 (e.g., a gesture in the air). In some implementations, the smart device 901 detects the gesture 1204 via radar. In some implementations, the smart device 901 adjusts operation based on the gesture 1204 (e.g., implements a particular function). For example, the person 1202 performs a waving gesture and in response the smart device 901 increases an audio playback volume.

Figure 12D:
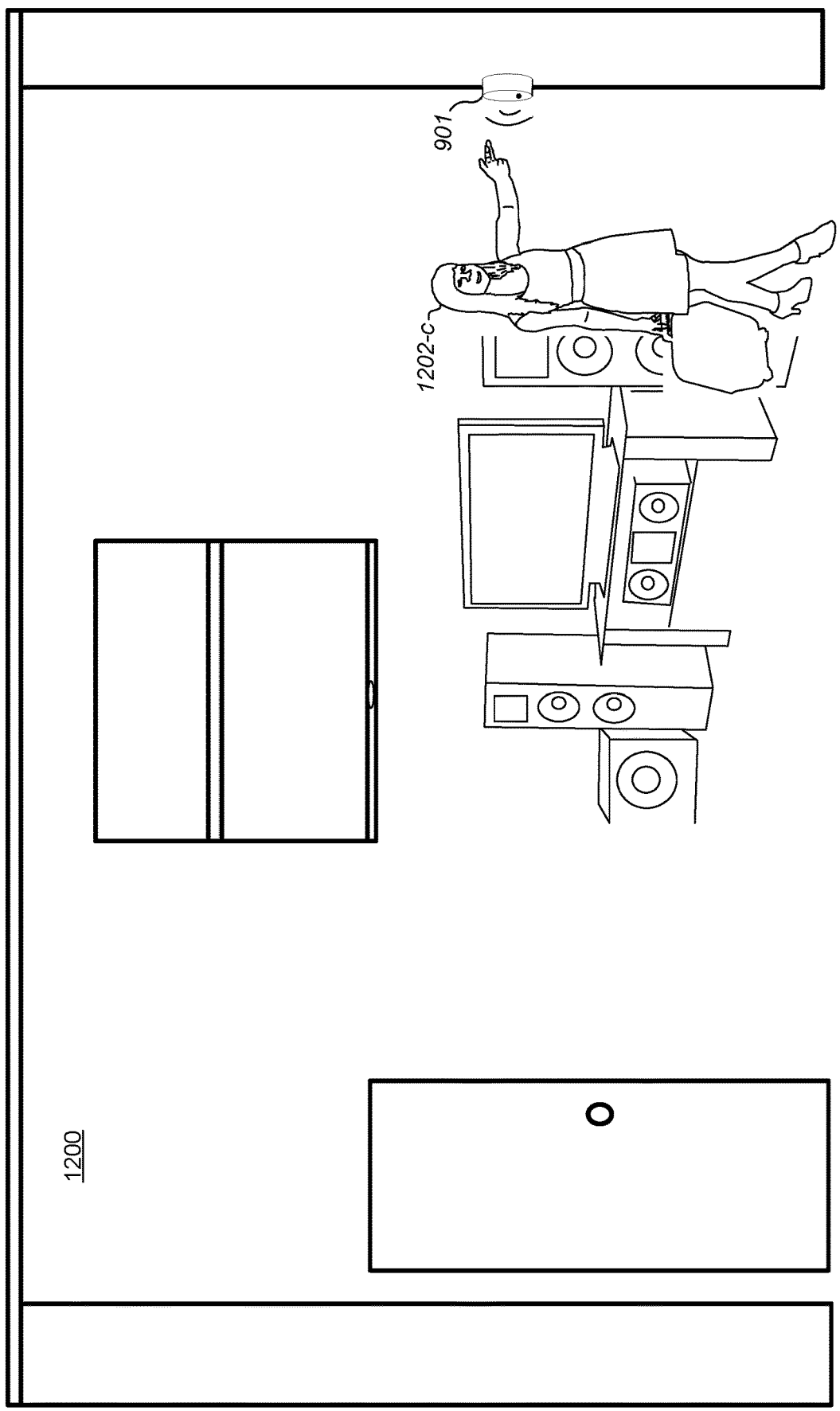

FIG. 12D shows the person 1202 at location 1202-c (e.g., approaching the smart device 901). In some implementations, the smart device 901 detects the approaching person 1202 and changes operating modes. For example, the smart device 901 determines that the person 1202 is within a particular radius of the smart device 901 and converts to a surface-input mode (e.g., lowers radar gain to avoid saturation due to contacts on the casing). In some implementations, a second device determines that the person 1202 is approaching the smart device 901 and notifies the smart device 901. In some implementations, the second device determines that the person 1202 is approaching the smart device 901 in conjunction with the smart device 901.

Figure 12E:
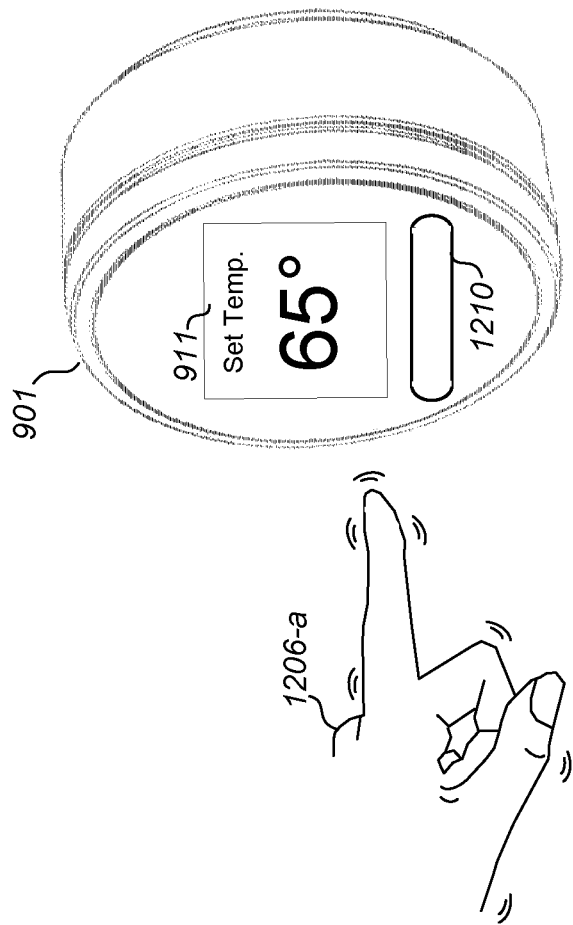

FIG. 12E shows a hand 1206 at location 1206-a proximate to, but not in contact with, smart device 901. FIG. 12E also shows smart device 901 including the display 911 and a slider 1210. FIG. 12E also shows minute movements of the hand 1206 (e.g., jitter) due to the hand hovering in the air (e.g., not being in contact with a solid surface).

Figure 12F:
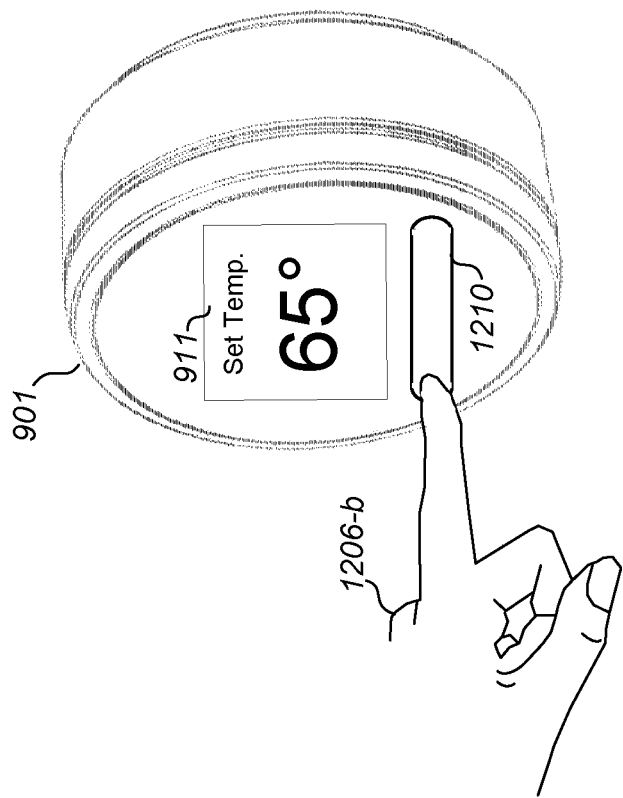
Figure 12G:
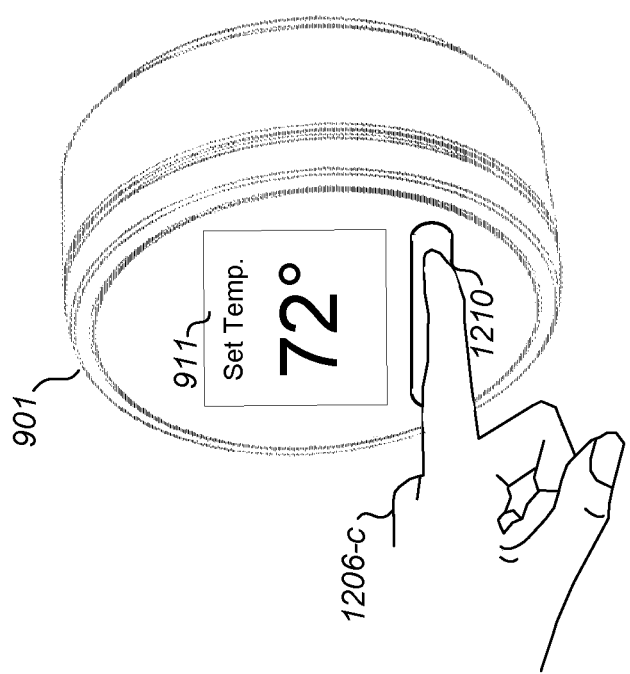

FIG. 12F shows the hand 1206 at location 1206-b in contact with the smart device 901. In FIG. 12F the hand 1206 is in contact with the smart device 901 at a location corresponding to one end of the slider 1210. FIG. 12F also shows a reduction in the jitter of the hand as a result of the hand being in contact with a solid surface, the smart device 901. FIG. 12G shows the hand 1206 at location 1206-c corresponding to the other end of the slider 1210, as a result of a swipe gesture across the slider 1210. FIG. 12G also shows the temperature set point changing from 65 degrees in FIG. 12F to 72 degrees in FIG. 12G as a result of the swipe gesture.

Figure 13A:
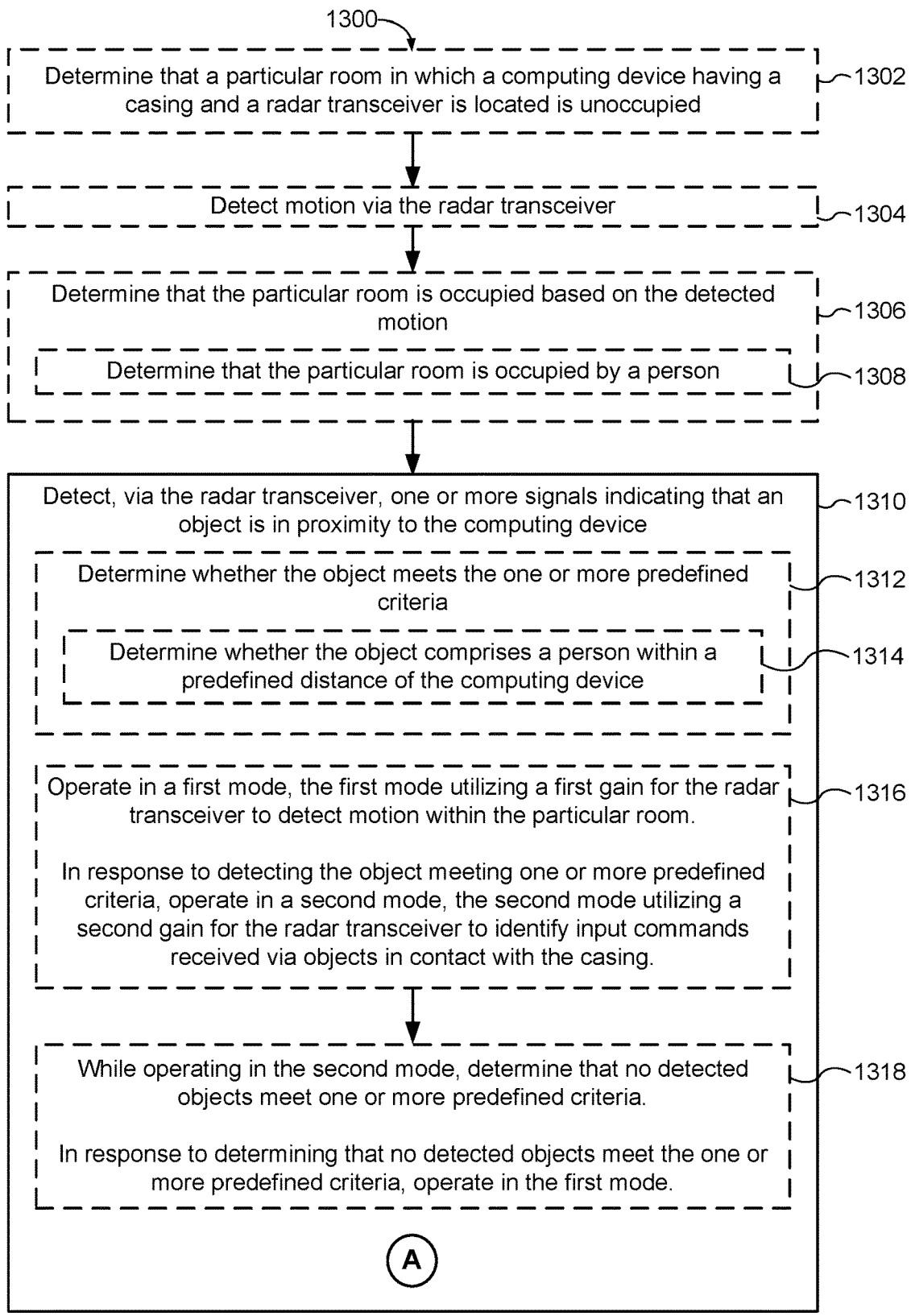
FIGS. 13A-13C are flowcharts illustrating a method of implementing a radar-based user interface, in accordance with some implementations.
Figure 13B:
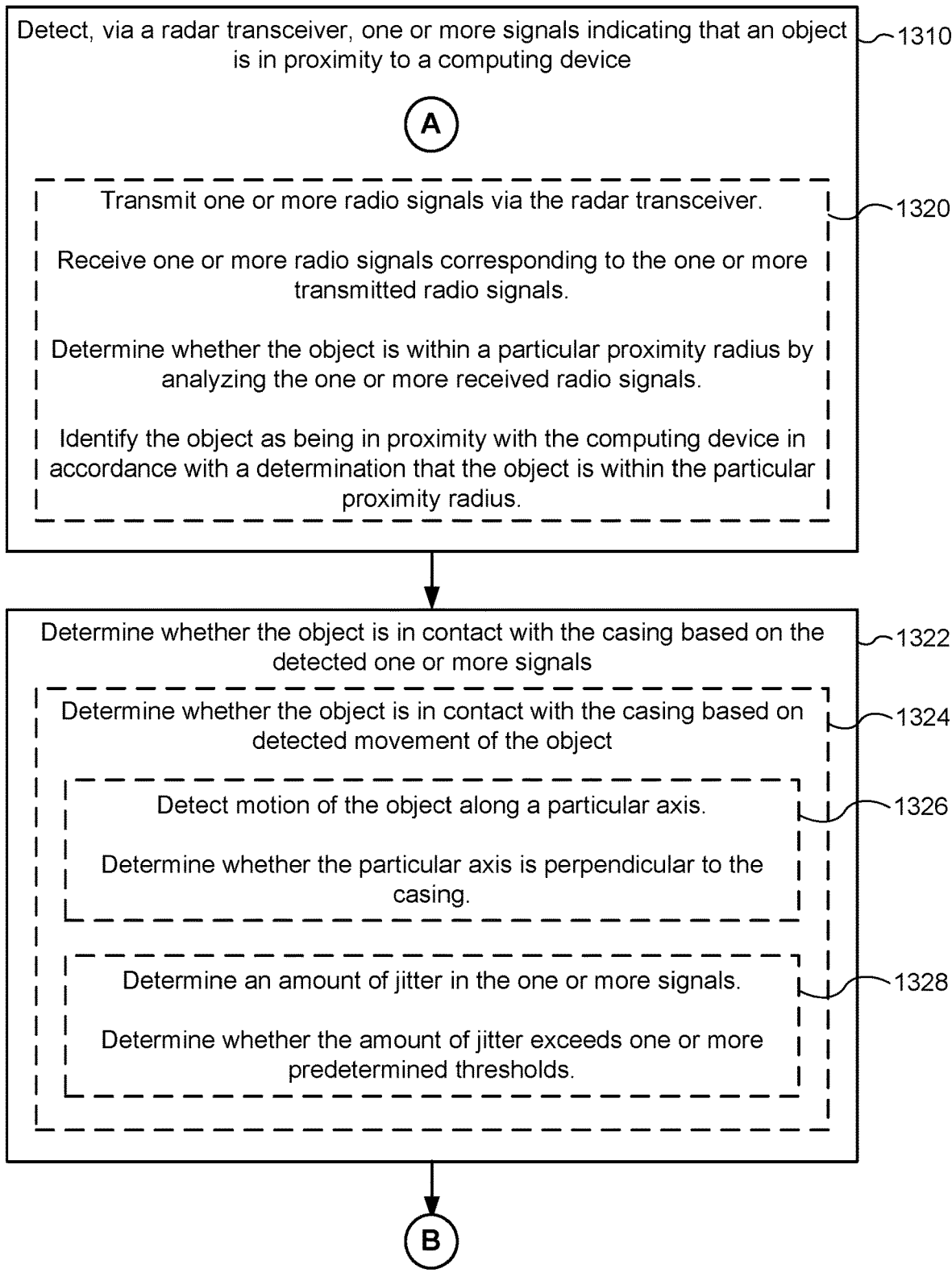
Figure 13C:
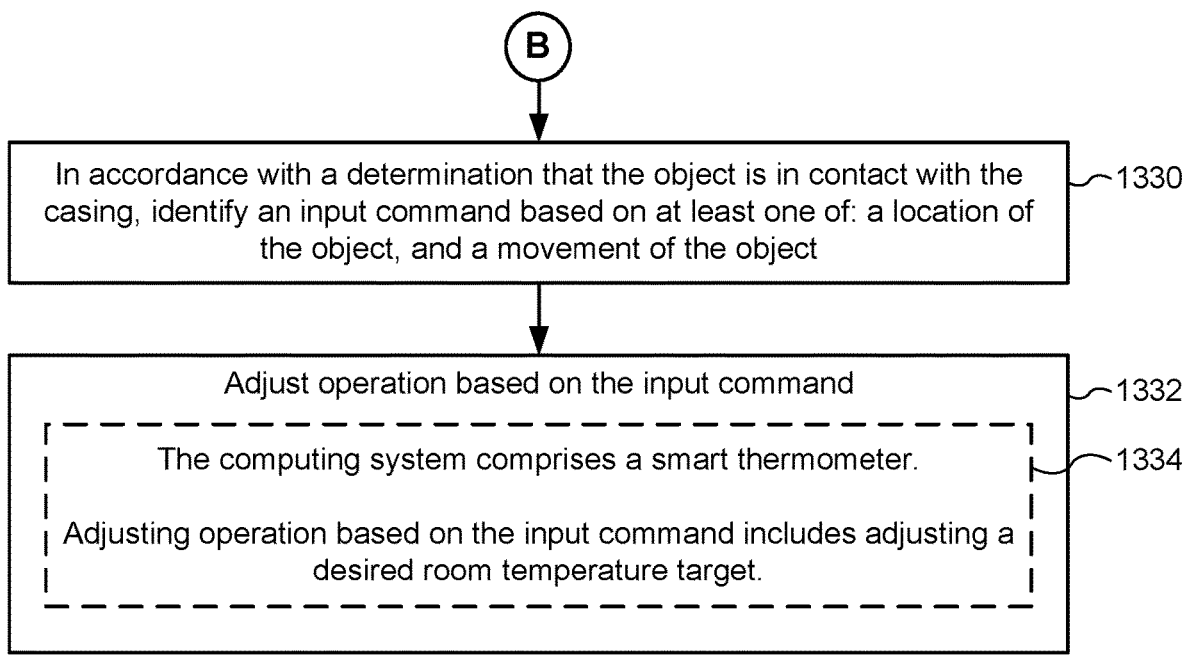

Attention is now directed to the flowchart representations of FIGS. 13A-13C. FIGS. 13A-13C are flowcharts illustrating a method of implementing a radar-based user interface, in accordance with some implementations. In some implementations, the method 1300 is performed by: (1) one or more electronic devices of one or more systems, such as the devices of a smart home environment 100, FIG. 1; (2) one or more computing systems, such as smart home provider server system 164 of FIG. 1 and/or server system 508 of FIG. 5; or (3) a combination thereof. In some implementations, the method 1300 is governed by instructions that are stored in a non-transitory computer-readable storage medium and that are executed by one or more processors of a device/computing system, such as the one or more CPU(s) 602 of hub device 180 (FIG. 6), the one or more CPU(s) 902 of smart device 204 (FIG. 9A), and/or one or more controllers 909 of smart device 901 (FIG. 9B). For convenience, the operations detailed below are described as being performed by a computing system having a casing and a radar transceiver.

In some implementations, the computing system determines (1302) that a particular room in which the computing device is located is unoccupied. In some implementations, the computing system determines that the room is unoccupied based on radar data (e.g., utilizing radar module 9420, FIG. 9A). For example, the computing system analyzes radar data and determines that no objects are currently in motion. In some implementations, the computing system determines that the room is unoccupied in conjunction with one or more other devices (e.g., other radar-equipped smart devices). For example, the particular room has 3 radar-equipped devices mounted within it and none of the devices detect a moving entity.

In some implementations, the computing system detects (1304) motion via the radar transceiver. In some implementations, the radar transceiver consists of a single dimensional antenna. In some implementations, the radar transceiver comprises multiple radar transmitters and/or receivers. In some implementations, the radar transceiver is a component of a communications module (e.g., communications module 942, FIG. 9A).

In some implementations, the computing system determines (1306) that the particular room is occupied based on the detected motion. In some implementations, the computing system utilizes a data processing module to make the determination (e.g., data processing module 9322 and/or radar processing module 9324). In some implementations, the computing system categorizes (e.g., using radar processing module 9324) the detected motion to determine if the motion is associated with a living entity (e.g., a person walking) or a non-living object (e.g., a fan spinning). In some implementations, the computing system determines that the particular room is occupied in accordance with a determination that the detected motion comprises motion of a living entity. In some implementations, the computing system transmits the radar data to a server system (e.g., server system 508, FIG. 5) and in response receives a categorization of the detected motion.

In some implementations, the computing system determines (1308) that the particular room is occupied by a person. In some implementations, the computing system determines that the room is occupied by a person based on characteristics of the moving objects and/or characteristics of the movement. For example, the computing system determines that a particular object is in motion. In this example, the computing system analyzes the particular object and determines that it has dimensions similar to a person. In this example, the computing system also analyzes the object's motion and determines that it is consistent with a person walking. In this example, based on those determinations, the computing system determines that the particular room is occupied by a person. In some implementations, the computing system uses audio data, visual data, and the like (e.g., in conjunction with the radar data) to determine that the moving object is a person. In some implementations, the computing device performs voice recognition and/or image recognition to determine that the moving object is a person. In some implementations, the computing system obtains data from a second device (e.g., a camera 118) indicating that the moving object is a person.

In some implementations, determining that the particular room is occupied based on the detected motion includes determining that the detected motion corresponds to a person moving within or entering the room. In some implementations, the computing system identifies the person occupying the room. In some implementations, the computing system adjusts operation based on a profile of the identified person.

The computing system detects (1310), via the radar transceiver (e.g., radar transceiver 907, FIG. 9B), one or more signals indicating that an object is in proximity (e.g., within arm's reach) to a computing device. In some implementations, the computing device receives one or more radar signals indicative of the presence of an object in the vicinity of the computing device. For example, the computing system determines that the object is within 3 feet, 2 feet, or 1 foot of a user interface of the system. In some implementations, the computing system determines whether the object in proximity to the computing system is moving toward the computing system.

In some implementations, the computing system determines (1312) whether the object meets the one or more predefined criteria. For example, the one or more criteria optionally include a criterion that the object is a person, a criterion that the object is moving toward the system, and/or a criterion that the object is within a particular radius of the system. In some implementations, the computing system determines (1314) whether the object comprises a person within a predefined distance of the computing device. In some implementations, determining whether the object meets the one or more predefined criteria comprises determining whether the object comprises a person moving toward the computing device. For example, the computing system is configured to respond to persons moving toward the computing device, but not dogs or cats.

In some implementations, the computing system: (1) operates (1316) in a first mode, the first mode utilizing a first gain for the radar transceiver to detect motion within the particular room; and (2) in response to detecting the object meeting one or more predefined criteria, operates in a second mode, the second mode utilizing a second gain for the radar transceiver to identify input commands received via objects in contact with the casing. In some implementations, the gain is applied to an analog-to-digital converter (ADC) of the radar transceiver. In some implementations, the first gain is larger than the second gain. In some implementations, the computing device operates in the second mode in in accordance with a determination that the object meets the one or more predefined criteria. For example, a determination that the object comprises a person moving toward the computing device.

In some implementations, while operating in the second mode, the computing system: (1) determines (1318) that no detected objects meet one or more predefined criteria; and (2) in response to determining that no detected objects meet the one or more predefined criteria, operates in the first mode. In some implementations, in response to detecting the person moving away from the system, the system switches to the first mode. In some implementations, the system periodically checks, via radar, whether any objects meet the one or more predefined criteria. In some implementations, the computing system operates in the first mode in accordance with a determination that no objects meet the criteria and operates in the second mode in accordance with a determination that at least one object meets the criteria. In some implementations, the criteria for initiating operation of the system in the first mode (e.g., switching from the second mode to the first mode) are distinct from the criteria for initiating operation of the system in the second mode (e.g., switching from the first mode to the second mode).

In some implementations, the computing system: (1) transmits (1320) one or more radio signals via the radar transceiver; (2) receives one or more radio signals corresponding to the one or more transmitted radio signals (e.g., via the radar transceiver); (3) determines whether the object is within a particular proximity radius by analyzing the one or more received radio signals; and (4) identifies the object as being in proximity with the computing device in accordance with a determination that the object is within the particular proximity radius. For example, the radio signals are transmitted at 3-10 GHz, 24-24.5 GHz, 57-64 GHz, and/or 77-81 GHz.

The computing system determines (1322) whether the object is in contact with the casing based on the detected one or more signals. For example, the system determines that the object is in contact with the casing based on the position and/or the movement of the object.

In some implementations, while operating in the first mode, the system detects, via radar, an object in proximity to the system. In response the system switches to operating in a second mode. While operating in the second mode the system detects, via radar, that the object is in contact with the casing.

In some implementations, the computing system determines (1324) whether the object is in contact with the casing based on detected movement of the object. In some implementations, a lack of movement along a particular axis (e.g., an axis perpendicular to the surface of the casing) indicates that the object is in contact with the casing. In some implementations, a drop in noise for the detected object's signal, or noise below a predetermined threshold, indicates that the object is in contact with the casing. In some implementations, a drop in the object's jitter indicates that the object is in contact with the casing. In some implementations, the object's jitter being below a particular threshold indicates that the object is in contact with the casing.

In some implementations, the computing system: (1) detects (1326) motion of the object along a particular axis; and (2) determines whether the particular axis is perpendicular to the casing. For example, if the movement is perpendicular to the casing then the object is moving toward or away from the computing device and thus is not in contact with the casing.

In some implementations, the computing system: (1) determines (1328) an amount of object jitter in the one or more signals; and (2) determines whether the amount of jitter exceeds one or more predetermined thresholds. For example, if the object has significant jitter then the object is likely not in contact with the surface. A drop in jitter indicates that the object is resting on the casing.

In accordance with a determination that the object is in contact with the casing, the computing system identifies (1330) an input command based on at least one of: a location of the object, and a movement of the object (e.g., the object's velocity). In some implementations, the location of the object and the movement of the object are determined based on radar signals from the radar transceiver. In some implementations, the system identifies a particular input gesture based on the location and movement of the object across the casing surface.

The computing system adjusts (1332) operation based on the input command. For example, the system detects a contact at a location on the casing that corresponds to a virtual on/off button and, in response to the contact, the system toggles a particular feature on or off. As another example, the system detects a swipe-up gesture across the surface of the casing, and in response to the gesture, the system increases a particular parameter (e.g., volume, luminosity, temperature, etc.).

In some implementations, the computing system detects a plurality of contacts and identifies an input command based on the plurality of contacts. For example, a user uses two fingers to perform a pinch-in gesture and the computing system adjusts a parameter in response to identifying the pinch-in gesture. As another example, a user concurrently touches the casing in multiple particular locations and the system uses identifies the touches as an identifier for the user (e.g., instead of requiring the user to enter a password).

In some implementations: (1) the computing system comprises (1334) a smart thermometer; and (2) adjusting operation based on the input command comprises adjusting a desired room temperature target. In some implementations, the computing system includes one or more user interfaces. For example, a smart thermometer optionally includes an adjustment ring in addition to the radar-based touch interface. As another example, the computing system includes one or more mechanical buttons in addition to the radar-based touch interface.

In some implementations, the system comprises a doorbell and the gesture corresponds to activation of the bell. In some implementations, multiple gestures each correspond to a different activation of the bell (e.g., a different tone or melody). In some implementations, the system comprises a security pad and the gesture corresponds to a security gesture assigned to a particular person. In some implementations, the system determines the identification of the person based on the security gesture. In some implementations, the system generates an alert if unable to identify the person.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first mode could be termed a second mode, and, similarly, a second mode could be termed a first mode, without departing from the scope of the various described implementations. The first mode and the second mode are both modes, but they are not the same mode.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method performed at an electronic device located in a room, the electronic device having a casing, a first processor coupled to a radar transceiver, a second processor coupled to a motion sensor, and memory, the method comprising:
   using the second processor:
      determining using signals from the motion sensor that an object is in proximity to the electronic device; and
      in accordance with determining that the object is in proximity to the electronic device, waking up the first processor; and
   using the first processor:
      enabling operation of the radar transceiver;
      receiving a set of signals associated with the operation of the radar transceiver, the set of signals indicating an amount of jitter of the object;
      determining that the object is in contact with the casing when the amount of jitter indicated in the set of signals is below a predetermined threshold;
      in accordance with determining that the object is in contact with the casing, identifying an input command based on at least one of: a location of the object, and a movement of the object; and
      adjusting operation of the electronic device based on the input command.

2. The method of claim 1, wherein the motion sensor is distinct from the radar transceiver.

3. The method of claim 1, wherein the motion sensor is the radar transceiver.

4. The method of claim 3, wherein:
   determining using the signals from the motion sensor that the object is in proximity to the electronic device comprises utilizing a first gain for the radio transceiver; and
   determining that the object is in contact with the casing comprises utilizing a second gain for the radio transceiver, lower than the first gain.

5. The method of claim 3, wherein determining using the signals from the motion sensor that the object is in proximity to the electronic device comprises:
   transmitting one or more radio signals via the radar transceiver;
   receiving one or more radio signals corresponding to the one or more transmitted radio signals; and
   determining that the object is within a particular proximity radius to the electronic device by analyzing the one or more received radio signals.

6. The method of claim 1, further comprising:
   prior to using the second processor:
      placing the first processor in a sleep state; and
      operating the second processor continuously.

7. The method of claim 1, wherein the operations using the second processor are repeated continuously.

8. An electronic device comprising:
   a casing;
   a first processor coupled to a radar transceiver;
   a second processor coupled to a motion sensor; and
   memory coupled to the first and second processors, the memory storing one or more programs configured to be executed by the first and second processors, the one or more programs including instructions for:
   using the second processor:
      determining using signals from the motion sensor that an object is in proximity to the electronic device; and
      in accordance with determining that the object is in proximity to the electronic device, waking up the first processor; and
   using the first processor:
      enabling operation of the radar transceiver;
      receiving a set of signals associated with the operation of the radar transceiver, the set of signals indicating an amount of jitter of the object;
      determining that the object is in contact with the casing when the amount of jitter indicated in the set of signals is below a predetermined threshold;
      in accordance with determining that the object is in contact with the casing, identifying an input command based on at least one of: a location of the object, and a movement of the object; and
      adjusting operation of the electronic device based on the input command.

9. The electronic device of claim 8, wherein the motion sensor is distinct from the radar transceiver.

10. The electronic device of claim 8, wherein the motion sensor is the radar transceiver.

11. The electronic device of claim 8, wherein the instructions for determining using the signals from the motion sensor that object is in proximity to the electronic device comprise instructions for receiving the signals from a second electronic device, distinct from the electronic device.

12. The electronic device of claim 8, wherein:
   the electronic device comprises a smart thermometer; and
   the instructions for adjusting operation of the electronic device based on the input command comprise instructions for adjusting a desired room temperature target.

13. A non-transitory computer-readable storage medium storing one or more programs, the one or more programs comprising instructions, which when executed by an electronic device located in a room, the electronic device having a casing, a first processor coupled to a radar transceiver, a second processor coupled to a motion sensor, and memory, cause the electronic device to perform operations comprising:
   using the second processor:
      determining using signals from the motion sensor that an object is in proximity to the electronic device; and
      in accordance with determining that the object is in proximity to the electronic device, waking up the first processor; and using the first processor:
- enabling operation of the radar transceiver;
- receiving a set of signals associated with the operation of the radar transceiver, the set of signals indicating an amount of jitter of the object;
- determining that the object is in contact with the casing when the amount of jitter indicated in the set of signals is below a predetermined threshold;
- in accordance with determining that the object is in contact with the casing, identifying an input command based on at least one of: a location of the object, and a movement of the object; and
- adjusting operation of the electronic device based on the input command.

14. The non-transitory computer-readable storage medium of claim 13, the operations further comprising:
prior to using the second processor:
- placing the first processor in a sleep state; and
- operating the second processor continuously.

15. The non-transitory computer-readable storage medium of claim 13, wherein the operations using the second processor are repeated continuously.

16. The non-transitory computer-readable storage medium of claim 13, wherein determining using signals from the motion sensor that the object is in proximity to the electronic device comprises receiving the signals from a second electronic device, distinct from the electronic device.

* * * * *